United States Patent
Vorst et al.

(10) Patent No.: US 9,470,967 B1
(45) Date of Patent: Oct. 18, 2016

(54) MOTION-BASED SYSTEM USING A CONSTANT VERTICAL RESOLUTION TOROIDAL DISPLAY

(71) Applicant: The Boeing Company, Chicago, IL (US)

(72) Inventors: Carl J. Vorst, St. Ann, MO (US); Harold R. Streid, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 14/277,409

(22) Filed: May 14, 2014

Related U.S. Application Data

(63) Continuation-in-part of application No. 13/909,392, filed on Jun. 4, 2013, now Pat. No. 9,110,358.

(51) Int. Cl.
| | |
|---|---|
| *G03B 21/00* | (2006.01) |
| *G03B 21/606* | (2014.01) |
| *G09B 9/08* | (2006.01) |
| *H04N 9/31* | (2006.01) |
| *G09B 9/02* | (2006.01) |

(52) U.S. Cl.
CPC .............. *G03B 21/606* (2013.01); *G03B 21/00* (2013.01); *G09B 9/02* (2013.01); *G09B 9/08* (2013.01); *H04N 9/3147* (2013.01); *H04N 9/3185* (2013.01); *H04N 9/3188* (2013.01); *H04N 9/3197* (2013.01)

(58) Field of Classification Search
CPC ...... G03B 21/00; G03B 21/606; G03B 9/02; H04N 9/3147; H04N 9/3185; H04N 9/3188; H04N 9/3197
See application file for complete search history.

(56) References Cited

U.S. PATENT DOCUMENTS

| | | | |
|---|---|---|---|
| 3,785,715 A | 1/1974 | Mecklenborg | |
| 4,899,293 A | 2/1990 | Dawson et al. | |
| 5,130,794 A | 7/1992 | Ritchey | |
| 5,320,534 A | 6/1994 | Thomas | |
| 6,137,492 A | 10/2000 | Hoppe | |

(Continued)

OTHER PUBLICATIONS

Rockwell Collins Griffin Rear-Projected Dome, http://www.rockwellcollins.com/sitecore/content/Data/Products/Simulation/Visual_Display_Systems/GriffinRear-ProjectedDome.aspx, 2011. \.

(Continued)

*Primary Examiner* — Sultan Chowdhury
*Assistant Examiner* — Magda Cruz
(74) *Attorney, Agent, or Firm* — Baldauff IP, LLC; Michael J. Baldauff, Jr.

(57) ABSTRACT

The present disclosure is generally directed toward a visual image projection and display system including a motion platform, a toroidal constant vertical resolution surface having a bottom portion mounted to the motion platform and capable of displaying a single substantially constant vertical resolution image by blending portions of adjacent projected images on the toroidal constant vertical resolution surface, a top surface screen intersecting the top portion of the constant vertical resolution surface defined by a circular azimuth curve, and a set of image projectors. The set of image projectors include a radial array of image projectors mounted on the motion platform that project a corresponding series of images via at least one mirror attached to the motion platform onto a convex portion of the toroidal constant vertical resolution surface, and at least one image projector that projects an image on the top surface screen.

20 Claims, 23 Drawing Sheets

(56) References Cited

U.S. PATENT DOCUMENTS

| | | | |
|---|---|---|---|
| 6,152,739 | A | 11/2000 | Amery et al. |
| 6,243,207 | B1 | 6/2001 | Kawamura et al. |
| 6,373,489 | B1 | 4/2002 | Lu et al. |
| 6,600,485 | B1 | 7/2003 | Yoshida et al. |
| 6,618,049 | B1 | 9/2003 | Hansen |
| 6,811,264 | B2 | 11/2004 | Raskar et al. |
| 7,033,177 | B2 * | 4/2006 | Kim ................. G09B 9/12 434/29 |
| 7,414,595 | B1 | 8/2008 | Muffler |
| 7,619,626 | B2 | 11/2009 | Bernier |
| 7,907,167 | B2 | 3/2011 | Vesely et al. |
| 8,194,193 | B2 | 6/2012 | Streid et al. |
| 8,241,038 | B2 | 8/2012 | Quinn et al. |
| 2003/0194683 | A1 | 10/2003 | Vorst |
| 2003/0224333 | A1 | 12/2003 | Vastvedt |
| 2006/0256113 | A1 | 11/2006 | Grover et al. |
| 2009/0066858 | A1 | 3/2009 | Turner et al. |
| 2009/0189917 | A1 | 7/2009 | Benko et al. |
| 2009/0201430 | A1 * | 8/2009 | Streid ................. G09B 9/08 348/744 |
| 2009/0231331 | A1 | 9/2009 | Holland |
| 2010/0027093 | A1 | 2/2010 | Doucet |
| 2012/0001915 | A1 | 1/2012 | Peterson |

OTHER PUBLICATIONS

Browne, Mike et al., Vergence Mismatch Effects in a Binocular See-through HMD integrated with Faceted Simulators, Proceedings of the Interservice/Industry Training, Simulation, and Education Conference, 2008.

* cited by examiner

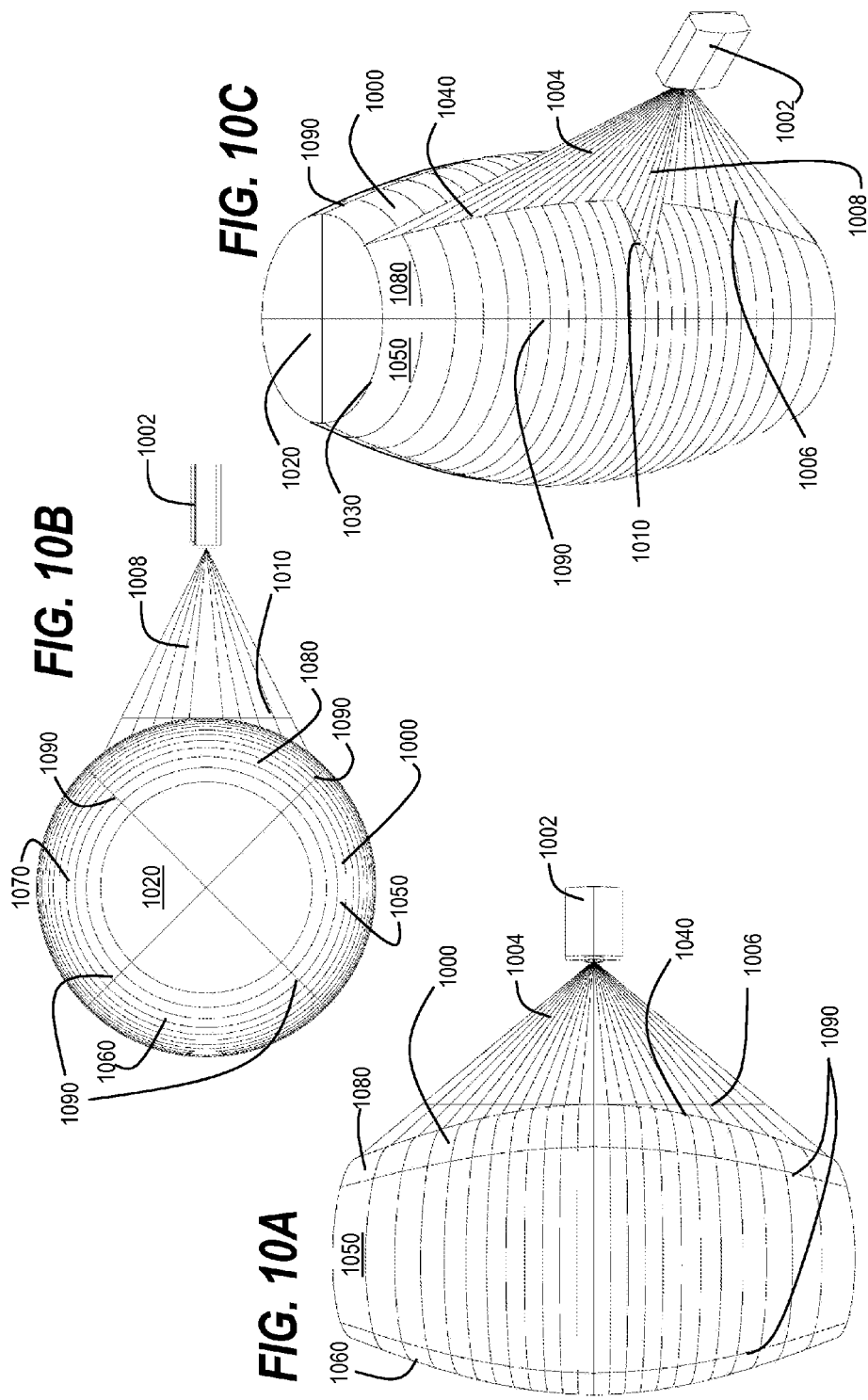

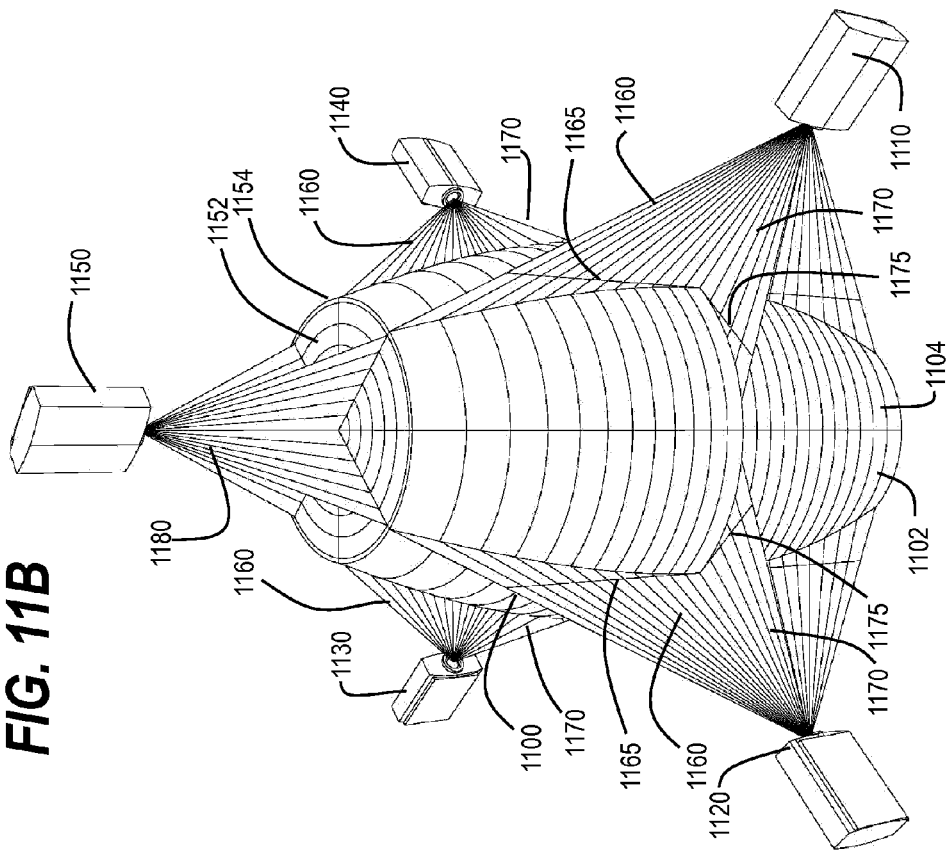
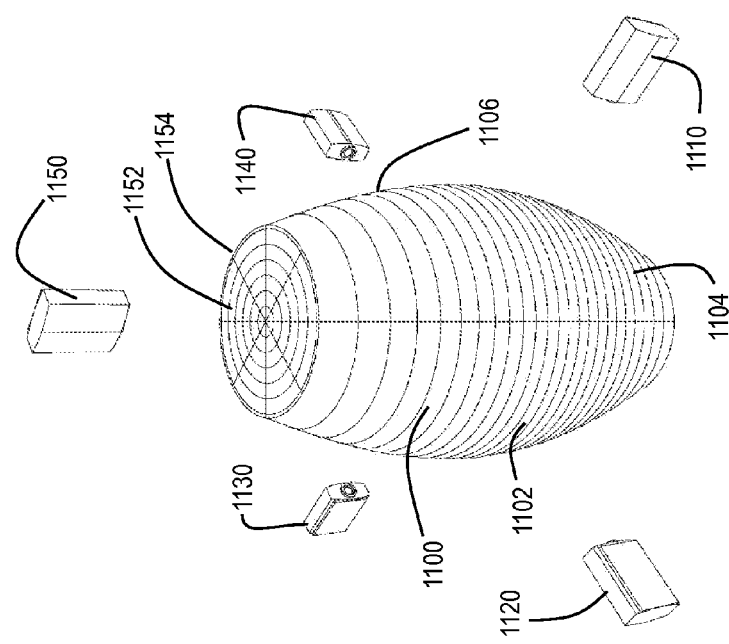
FIG. 11B
FIG. 11A

MOTION-BASED SYSTEM USING A CONSTANT VERTICAL RESOLUTION TOROIDAL DISPLAY

CROSS-REFERENCE TO RELATED APPLICATIONS

This application is a continuation-in-part application of co-pending U.S. application Ser. No. 13/909,392, now U.S. Pat. No. 9,110,358, filed on Jun. 4, 2013, entitled, "Method For Creating And a System For Using A Constant Verticle Resolution Toroidal Display", which is herein incorporated in its entirety.

TECHNICAL FIELD

The embodiments presented herein are generally to projection display systems having a constant vertical resolution as a function of elevation. More particularly, the present application is directed to a method and system for a visual image projection and display system that create a wide field of view display using fixed matrix projectors that are preferably of high definition format.

BACKGROUND

A simulator is a device that simulates a particular experience as realistically as possible. For example, a flight simulator simulates the experience of flying an aircraft, such as an airplane or helicopter. A vehicle driver simulator attempts to create the experience of driving a vehicle over streets or off-road terrains. Simulators typically use display systems to create a field of view displaying what the user might see if the user were actually flying an aircraft or driving a vehicle. Simulators may also provide simulated controls and steering devices associated with the particular aircraft or vehicle, and/or added motion to simulate movement of the aircraft or vehicle.

The visual systems currently in use in simulators were developed for use with four by three (4:3) aspect ratio cathode ray tube (CRT) projectors. However, currently available simulators do not fully exploit the recent advances in visual display technology, such as fixed matrix digital projectors in general, and especially High Definition Television (HDTV) format fixed matrix projectors with wide aspect ratios, such as, without limitation, sixteen by nine (16:9) aspect ratio format. Also, the modern fixed matrix projectors do not have the ability for image scaling without the loss of image resolution since the image source is made up of a mechanically fixed array of image sources instead of a continuous image surface, as with a CRT projector.

In addition, because the shape of the flat screen segments used to tessellate an arrangement of rear projection screens around the eye-point in currently available simulators were designed for four by three (4:3) aspect ratio projectors, the resulting display systems are poorly suited to the use of wide aspect ratios typically used in high definition systems.

For simulation display purposes, users have assumed a goal of providing eye-limited visual performance. Existing display systems have typically used arrangements of flat rear projection screens or dome shaped rear projection screens, neither of which are optimum for creating an eye-limited wide field of view display with constant vertical resolution from the eye-point. In other words, existing display system screens are not capable of providing an eye-limited full field of view display for simulators, such as aircrew training systems.

Pilot training for high performance aircraft has usually required two training devices, one for initial pilot training and one for weapons and tactics training. The initial pilot training system requires a high fidelity cockpit and control law simulation with a motion base for proprioceptive cueing but only a rudimentary visual system. Tactical training devices would have high fidelity weapons systems models and visual systems that are typically not compatible with motion. Tactical training devices may also be networked with other devices in the same facility to allow multi-ship training. There is a need for a pilot training device with a wide field of view, high fidelity visual system that is compatible with motion, yet is small enough so that multiple devices can be installed in the same facility. The visual system for such a device must allow the use of a high fidelity representation of the actual aircraft cockpit. In order to prevent shadowing of projected images by a trainer cockpit structure or by the pilot trainee, cross-cockpit collimated displays or front projected domes have previously been used. Collimated displays, however, are too limited in field of view for tactical aircraft and front projected domes have to be relatively large to prevent shadowing, which limits the number of trainers that can be placed in a single facility with limited space. On the other hand, use of a rear-projected circular dome mitigates the cockpit shadowing, but requires a relatively large number of projectors due to image distortion as a projected image wraps around the outside curvature of the circular dome.

There are only two types of high fidelity visual systems that have been used on motion base simulators. One uses the cross-cockpit collimated display system and the other uses the front projected circular dome display system. The cross-cockpit collimated display was designed for transport aircraft, with side-by-side seated pilots, and does not have the appropriate field of view for a fast jet or attack helicopter. This type of a display system has been used on a limited basis for these applications by extending vertical and horizontal fields of view. Vertical field of view is generally restricted to 60 degrees. Achieving a horizontal field of view beyond approximately 200 degrees becomes relatively expensive. The front projected dome has been used for fixed wing fighter and attack helicopter simulators but because the projectors must be on the same side of the screen as the cockpit, the projectors were placed in non-ideal locations that compromise resolution uniformity and projector efficiency. In addition, in order to prevent shadowing of the projected image, either the dome was made large or portions of the aircraft structure, such as the physical representation attack helicopter overhead cockpit structure was removed. This structure provides visual spatial references that are very important for initial pilot training. Furthermore, both the cross cockpit collimated and front projected dome displays require large facilities with high ceilings and are not compatible with the types of facilities used for tactical training devices. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a vehicle simulation system includes a vehicle simulator control system, a motion platform capable of responding to motion signals from the vehicle simulator control system, a simulated vehicle control center mounted to the motion platform, and a visual display system mounted to the motion platform and substantially surrounding the simulated vehicle control center. The visual display system includes projectors capable of projecting a simulated visual display around the simulated vehicle control center, and an image projection screen capable of receiving the simulated visual display from the image projectors on a convex portion of the image projection screen. The image projection screen has a toroidal constant vertical resolution surface defined by a constant vertical resolution elevation curve that may be at least partially rotated about at least a portion of a central vertical axis intersecting with a design eye-point of a viewer relative to the simulated vehicle control center to produce the toroidal constant vertical resolution surface in a vertical direction as a function of elevation.

In another embodiment disclosed herein, a vehicle simulation system includes a motion platform capable of being articulated in a variety of directions, a simulated vehicle control center mounted to the motion platform, image projectors capable of projecting a simulated visual display around the simulated vehicle control center, and an image projection screen capable of receiving the simulated visual display from the image projectors on a convex portion of the image projection screen. The image projection screen has a toroidal constant vertical resolution surface generated by identifying: 1) a design eye-point of a viewer relative to the simulated vehicle control center to be positioned on a concave portion of the toroidal constant vertical resolution surface; 2) a viewing distance from the design eye-point of the viewer to the concave portion of the toroidal constant vertical resolution surface in a direction of a projected image from one of the image projectors; and 3) a projection distance from one of the plurality image projectors to a convex portion of the toroidal constant vertical resolution surface in a direction toward the design eye-point of the viewer.

A constant vertical resolution elevation curve is created based on a locus of points defined by an intersection of a set of equal angular increment lines of the viewing distance from the design eye-point of the viewer with a set of equal pixel size increment lines of the projected image from one of the image projectors based on the projection distance from one of the image projectors. The toroidal constant vertical resolution surface is created being defined by a constant vertical resolution elevation curve that may be at least partially rotated about at least a portion of a central vertical axis intersecting with the design eye-point of the viewer relative to the simulated vehicle control center to produce the toroidal constant vertical resolution surface in a vertical direction as a function of elevation.

In another embodiment disclosed herein, a visual image projection and display system includes a motion platform, a toroidal constant vertical resolution surface having a bottom portion mounted to the motion platform and capable of displaying a single substantially constant vertical resolution image by blending portions of adjacent projected images on the toroidal constant vertical resolution surface, a top surface screen intersecting a top portion of the constant vertical resolution surface defined by a circular azimuth curve, and a set of image projectors. The set of image projectors include a radial array of image projectors mounted on the motion platform that project a corresponding series of images via at least one mirror attached to the motion platform onto a convex portion of the toroidal constant vertical resolution surface, and at least one image projector that projects an image on the top surface screen.

In another embodiment disclosed herein, a method of using a visual image projection and display system includes providing a motion platform, a toroidal constant vertical resolution surface having a bottom portion mounted to the motion platform, and a radial array of image projectors mounted on the motion platform that project a corresponding series of images via at least one mirror attached to the motion platform onto a convex portion of the toroidal constant vertical resolution surface. The method further displays a single substantially constant vertical resolution image on the toroidal constant vertical resolution surface by blending portions of adjacent projected images. The method further provides a top surface screen intersecting the a top portion of the constant vertical resolution surface defined by a circular azimuth curve and displays an image on the top surface screen by at least one image projector.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein:

FIGS. 10A-10C illustrate another embodiment of a constant vertical resolution curvature screen surface used to receive an image from a single projection device;

FIGS. 11A-11B illustrate another embodiment of a constant vertical resolution curvature screen surface used to receive a number of images from a corresponding number of projection devices;

DETAILED DESCRIPTION

This embodiments presented herein use a unique rear projection screen shape that reduces image distortion caused by the projected image wrapping around the outside curvature of a rear-projected dome, while still allowing a large field of view without cockpit shadowing or excessive size of the display. This approach to visual system design enables a high fidelity wide field of view visual system to be fielded with a high fidelity simulated cockpit that replicates the physical structure of the actual aircraft, all on a motion base.

The embodiments presented herein are further related to a display device that uses a toroidal constant vertical resolution rear-projection screen geometry in one axis (e.g. vertical axis) and circular geometry in the other perpendicular axis. The result is an egg shaped rear-projected visual display system that provides improved binocular head mounted display performance over typical constant vertical and horizontal resolution display geometry. The embodiments presented herein also remove the appearance of geometric discontinuities at the junction of screens in a multi-screen faceted configuration.

The embodiments disclosed herein only provide a constant resolution in the vertical direction. The present embodiments yield an improved performance when the user views an image on the screen with augmented reality head mounted displays and that, although resolution is not constant in the horizontal direction, it has relatively minimal impact on image quality and the efficiency of displaying projected pixels. The current embodiments requires far fewer image projectors than pure dome displays, and remove visual discontinuities that exist in prior art adjoining sections of adjacent panels that have constant resolution in both the horizontal and the vertical direction.

By using constant vertical resolution geometry in one axis and aligning the long axis of a High Definition (HD) aspect ratio projector with that axis, a considerably larger angle can be covered than possible with either a flat or domed screen. Aligning the short axis of an HD aspect ratio projector in the direction of circular curvature results in minimal resolution variation and removes the appearance of geometric discontinuities at the junction of screens if the viewer is not positioned at the design eye-point. High definition systems are designed for utilization with higher aspect ratios and are capable of displaying images designed for screens with a greater width. In this case, the system is optimized for high aspect ratio (HD) projectors where the image is rotated 90 degrees to produce an image with greater height than width. An example of the optimization in the embodiments presented herein is that typical prior art systems using pure spherical domes for a rear projected display surface require approximately twice the number of image projectors and produce a substantially lower display resolution as the embodiments presented herein.

Figure 1:
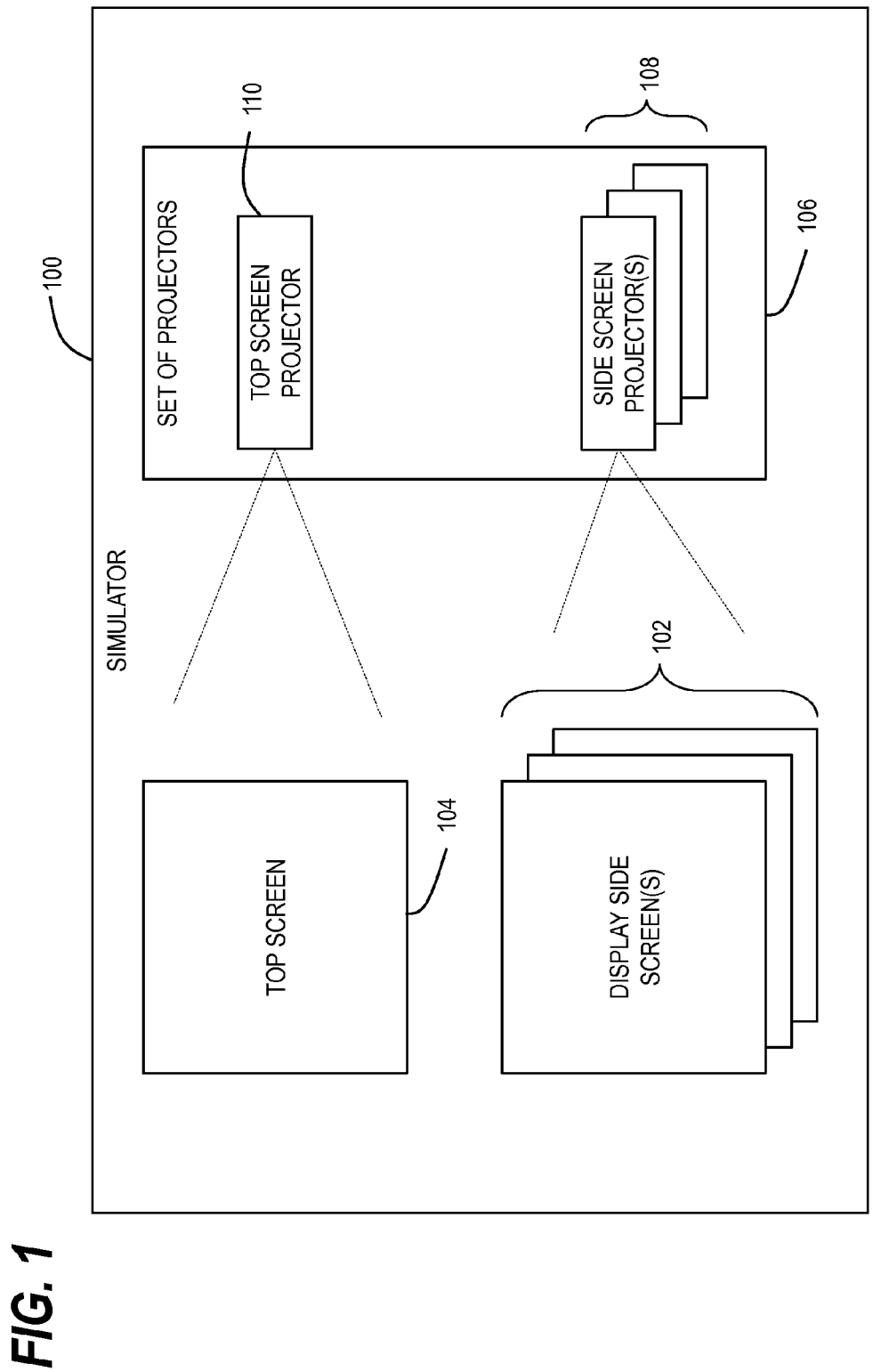
FIG. 1 illustrates one embodiment of simulator that may incorporate further embodiments disclosed herein.

FIG. 1 is a block diagram of a simulator in accordance with an advantageous embodiment. Simulator 100 is any type of visual display system for providing a full field of view display, such as, but not limited to, a flight simulator, a vehicle driver simulator, a planetarium display system, or any other type of full field of view display system. Simulator 100 includes a display side screen 102, (or a number of screens), that may include a set of one or more display side screens. In other words, the display side screen 102 may include a single continuous screen or two or more adjacent screens. The display side screen 102 may be a display screen that is curved according to embodiment presented herein to create constant vertical resolution of the full view image displayed on the screen.

Simulator 100 optionally may include a single top screen 104 for displaying images in a high definition format. Top screen 104 may be a circular shaped screen for displaying images and may be either flat or domed-shaped.

Set of projectors 106 includes one or more projectors that may be homogenous projectors of the same type, the same aspect ratio, and/or the same number of pixels. In another embodiment, the set of projectors 106 includes heterogeneous projectors having different types of projectors, different numbers of pixels, and/or generating images with different aspect ratios.

A side screen projector 108, (or a number of side screen projectors corresponding to multiple display side screens 102), is associated with the display side screen 102 for projecting an image thereon. A set of projectors 106 may optionally include a top screen projector 110 that may have one or more projectors in a unique projector arrangement for top screen 104. For example, top screen projector 110 may include, without limitation, a single projector or a pair of projectors. In one embodiment, none of the images are rotated on the screen so projection mirrors may not be required for projector roll. In other words, the projectors in set of side screen projectors 108 and top screen projector 110 are oriented with zero roll. Simulator 100 may optionally include another embodiment where a set of one or more mirrors (not shown) project images from each projector to the screens 102, 104. One or more projector images may be rotated into a portrait display mode using one or more mirrors.

Figure 2:
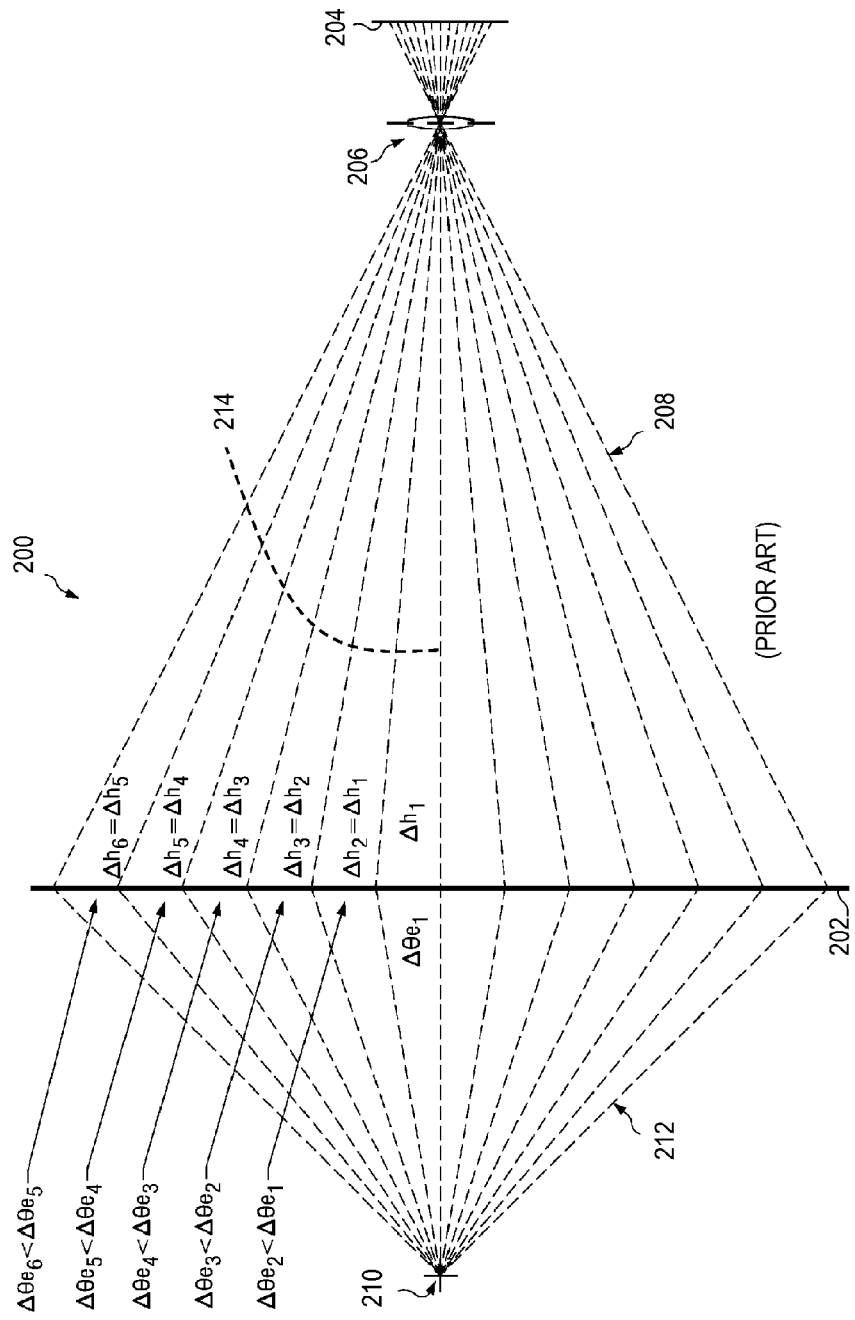
FIG. 2 illustrates a schematic representation of a prior art flat rear-projection screen.

FIG. 2 is a block diagram of a prior art flat rear-projection screen geometry 200 illustrating an image projected onto a flat rear-projection screen 202. Image origin 204 is an origin of an image generated by a fixed rectangular array of sources associated with a high definition format projector, (not shown), such as an array of pixels. Conventional projection lens 206 is a lens for focusing and magnifying the image produced by the fixed rectangular array of sources and is typically located inside the projector.

Image projector rays 208 are light rays carrying the image from the image origin 204 through the conventional projection lens 206. Image projector rays 208 are separated by a fixed distance Δh when imaged upon the flat rear-projection screen 202. Thus, projector rays 208 are equally spaced height rays projected onto a plane represented by the flat rear-projection screen 202.

From a design eye-point 210, observed image rays 212 are observed with a constant increment of height Δh to produce a higher angular resolution at the edge of the flat rear-projection screen 202 than at the center thereof. When equal height spaced image projector rays 208 are projected onto the flat rear-projection screen 208, unequal angles result between the illustrated observed image rays 212 when the image is viewed at the design eye-point 210. Thus, the resolution of the image displayed on the flat rear-projection screen 202 varies in resolution from the center of the screen to the edges of the screen when viewed by an observer inside a simulator at approximately the center of the simulator design eye-point 210 by creating a non-uniform image resolution on the flat rear-projection screen 202.

Alternatively stated, as illustrated, image projector rays 208 define equal distances of each segment Δh1-Δh6 on the flat rear-projection screen 202. However, their corresponding angles Δθe1-Δθe6 as measured from the design eye-point 210 along the observed image rays 212 decrease as the angles diverge from the centerline 214 defined between the conventional projection lens 206 and the design eye-point 210.

Figure 3:
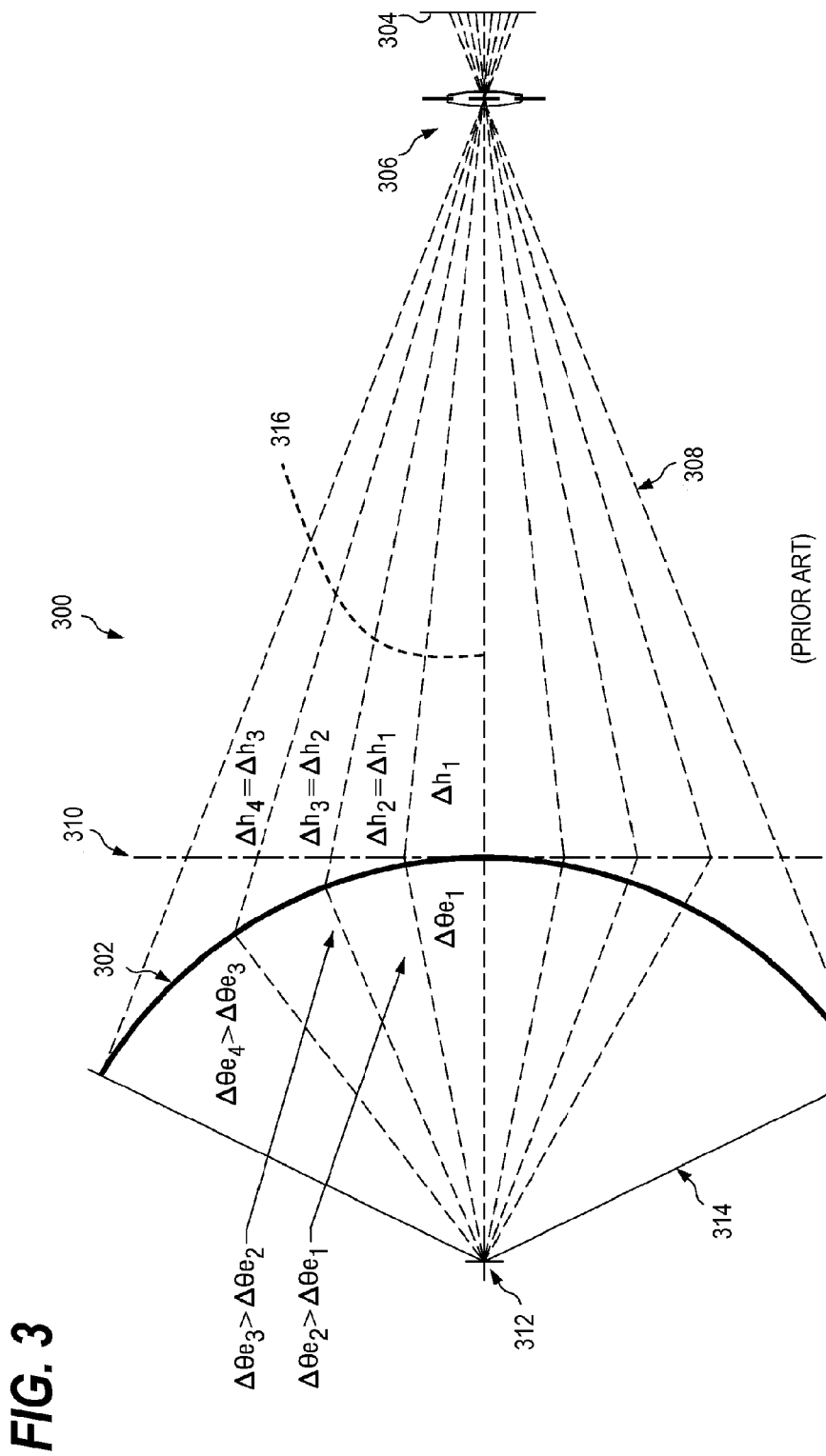
FIG. 3 illustrates a schematic representation of a prior art dome shaped rear-projected screen.

FIG. 3 is a block diagram of a prior art spherical rear-projection screen geometry 300 illustrating an image projected onto a dome shaped spherical rear-projection screen 302. Image origin 304 is an origin of an image generated by a fixed rectangular array of sources associated with a high definition format projector, (not shown), such as an array of pixels. Conventional projection lens 306 is a lens for focusing and magnifying the image produced by the fixed rectangular array of sources and is typically located inside the projector.

Image projector rays 308 are light rays carrying the image from the image origin 304 through the conventional projection lens 306. Image projector rays 308 are separated by a fixed distance Δh as the image projector rays 308 pass through a plane, represented by line 310, normal to the centerline direction of the image projector rays 308 toward the spherical rear-projection screen 302. The image projector rays 308 fall upon an exterior convex side of the spherical rear-projection screen 302 where each image projector ray 308 is separated by a fixed distance Δh.

A user sitting at the design eye-point 312 center curvature at the radius of the spherical rear-projection screen 302 views the interior displayed images projected upon the outside of the dome shaped spherical rear-projection screen 302. Spherical rear-projection screen 302 is a spherical, dome-shaped rear projection screen having a surface defined by a fixed radius (at 314) from the design eye-point 312.

From a design eye-point 312, observed image rays 314 are observed with a constant increment of height Δh to produce a higher angular resolution at the center of the spherical rear-projection screen 302 than at the edges thereof. When equal height spaced image projector rays 308 are projected through the plane 310 onto the exterior surface of the spherical rear-projection screen 302, unequal angles result between the illustrated observed image rays 314 when the image is viewed at the design eye-point 312. Thus, the resolution of the image displayed on the spherical rear-projection screen 302 varies in resolution from the edges of the screen to the center of the screen when viewed by an observer inside a simulator at approximately the center of the simulator design eye-point 312 by creating a non-uniform image resolution on the spherical rear-projection screen 302. In other words, equal height Δh in projection rays 308 result in unequal angle separation in the observed image rays 314 and variable resolutions in the displayed image viewed from design eye-point 312. This results in inefficient use of pixels and non-optimal image resolution.

However, in the following disclosed embodiments, a single display screen having an optimized screen curvature is provided to display images with a constant vertical resolution. As shown in FIGS. 2 and 3, prior art flat rear-projection screen 202 and dome shaped spherical rear-projection screen 302 do not provide constant vertical resolution when viewing a projected image from the design eye-point 210, 312 across their respective screen surfaces. However, the embodiments presented hereafter provide a screen having an optimized curvature that enables display of images on the screen with constant vertical resolution.

The constant vertical resolution screen curvature is defined as the curvature of a screen that is necessary to produce constant vertical resolution or near constant vertical resolution of images displayed on the screen. The constant vertical resolution screen curvature maps equal sized pixels in a projector to equal angles as viewed from the eye-point in the user's field of view.

Figure 4:
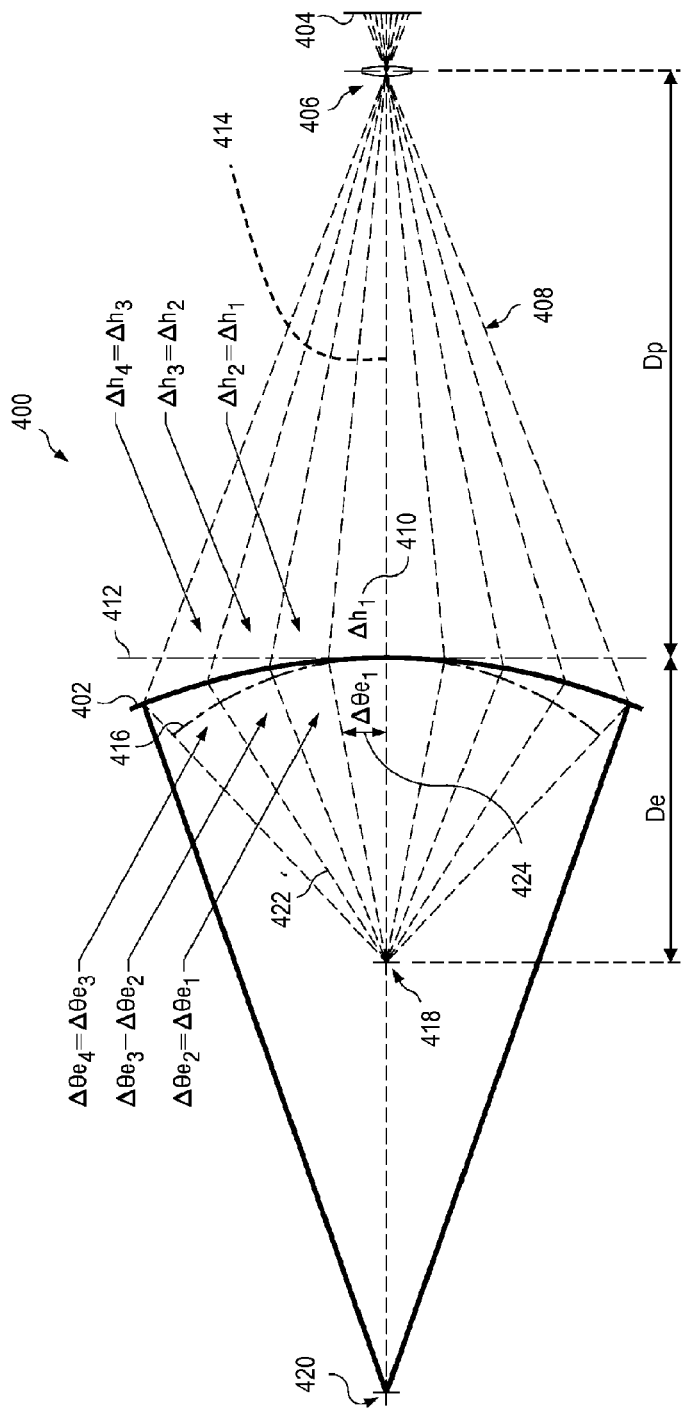
FIG. 4 illustrates a schematic representation of a rear-projection screen according to another embodiment presented herein having a constant vertical resolution curvature.

FIG. 4 illustrates constant vertical resolution curvature projection geometry 400 having a cross-section schematic view of a constant vertical resolution rear-projection screen 402 with a constant vertical resolution curvature in accordance with an advantageous embodiment presented herein.

The image origin 404 is the source of an image generated by a fixed rectangular array associated with a high definition format projector, (not shown), such as an array of pixels. Conventional projection lens 406 is a lens for focusing and magnifying the image produced by the fixed rectangular array of sources and is typically located inside the projector.

Image projector rays 408 are light rays carrying the image from the image origin 404 through the conventional projection lens 406. Constant separation image projector rays 408 are separated by a constant image separation distance Δh 410 as the constant separation image projector rays 408 pass through a plane, represented by line 412, normal to the centerline 414 direction of the constant separation image projector rays 408 toward the constant vertical resolution rear-projection screen 402. Plane 412 represents a flat rear-projection screen similar to the representative illustration of FIG. 2. The constant separation image projector rays 408 fall upon an exterior convex side of the constant vertical resolution rear-projection screen 402 where each image projector ray 408 is separated by a constant image separation distance Δh 410.

A location of a traditional spherical projection screen 416 with a constant radial distance to design eye-point 418 is similar to the representative illustration of FIG. 3. Design eye-point 418 is the point at which an observer might observe the image displayed on a flat screen at plane 412, the constant vertical resolution curvature rear projection screen 402 or curved screen 416. The center of constant vertical resolution curvature 420 is a center of curvature of a rear projection screen producing constant vertical resolution in conjunction with rear projection from a fixed matrix projector. The observed image equal angular rays 422 from the design eye-point 418 are intersected with the constant separation image projector rays 408 to form a locus of points defining the constant vertical resolution screen curvature at screen surface 402.

Thus, as shown in FIG. 4, there is an optimum screen curvature shown for a screen represented by constant vertical resolution rear-projection screen 402 such that constant image separation distances Δh 410 in the format of the projector's imaging chip 404 are mapped onto equal angles Δθe 424 of the observed image rays equal angular rays 422 for the viewing position at design eye-point 418. This curve 402 can be approximated to a high degree of accuracy by an arc of a radius 420 larger than the distance from design eye-point 418 to the curved screen 416 and which varies with image projection distance along the centerline 414 to the constant vertical resolution rear-projection screen 402.

In one embodiment, the curvature of a screen necessary to form a constant vertical resolution screen curvature 402 is determined by the constant separation image projector rays 408 from image source 404, through lens 406 projected through a plane 412 with constant image separation distance Δh 410. The observed image equal angular rays 422 with equal-angular separation Δθe 424 are projected from design eye-point 418 towards plane 412. The locus of points formed by the intersection of constant separation image projector rays 408 and observed image equal angular rays 422 thereby define the curvature of the constant vertical resolution screen surface 402. The curvature of the constant vertical resolution screen can be approximated by a section of a sphere with an optimum radius determined by selection of a radius that results in an optimum resolution variation from that produced with the constant vertical resolution screen.

Figure 5:
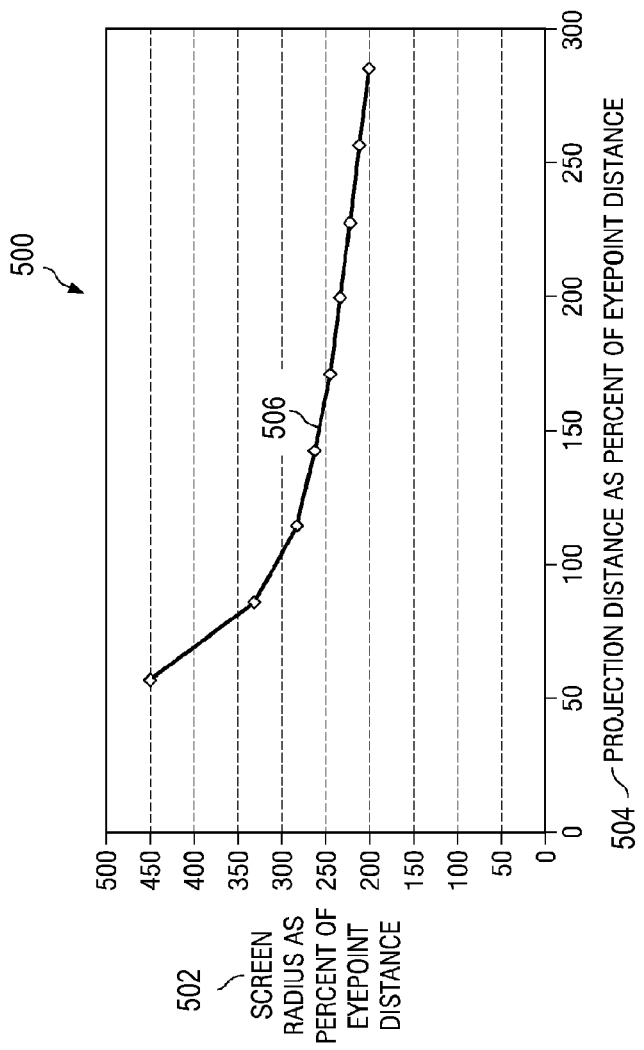
FIG. 5 is a graph illustrating a relationship between a screen radius and a projection distance in accordance with an embodiment presented herein.

The optimum curvature of the constant vertical resolution screen is a function of projector distance Dp and design eye-point distance De along centerline 414 between the projection lens 406 and the design eye-point 418. FIG. 5 illustrates a graph of a relationship between screen radius and projection distance in accordance with an advantageous embodiment. Graph 500 is a graph mapping the relationship between screen radius 502 and projection distance 504. In this graph, the optimum relationship between screen radius 502 and projection distance 504 is expressed as a percentage of observer viewing distance. As shown in line 506, the optimum curve in the rear projection screen to produce a constant vertical resolution in an image displayed on the screen is determined as a function of eye-point distance and projection distance.

Thus, to determine the optimum curve for a particular screen, an optimum radius is determined. The optimum radius may be identified using line 506 to determine the optimum relationship between projection distance, viewing distance, and the radius of a sphere. The viewing distance is the distance from an observer's eye to the display screen.

Figure 6:
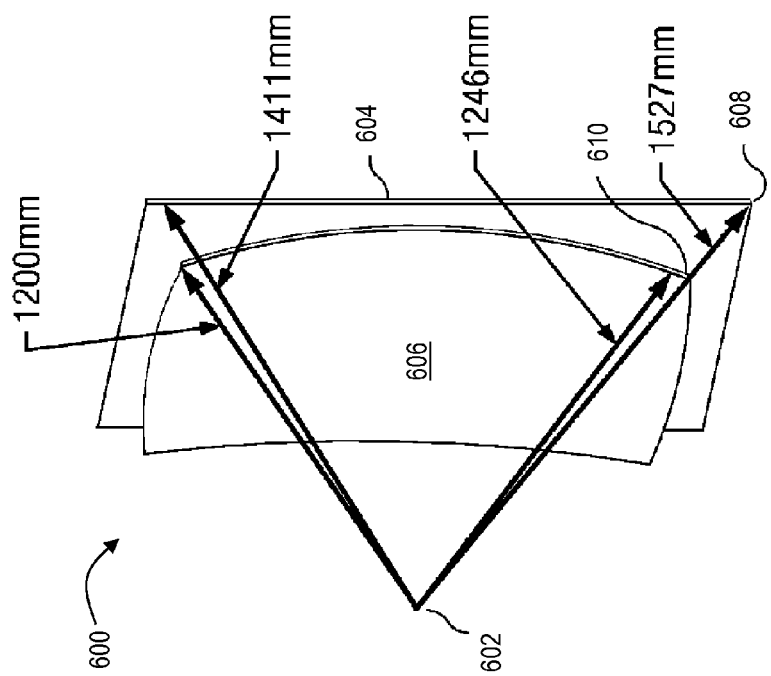
FIG. 6 illustrates another embodiment of a comparison of a perspective partial view of an eye-point to constant vertical resolution curvature screen distance versus an eye-point to a prior art flat screen distance.

FIG. 6 is a block diagram illustrating eye-point to screen distance in accordance with an advantageous embodiment. Eye to screen distances 600 are distances from an observer's eye-point 602 to a flat screen 604 and a curved screen 606. The distances from the observer's eye-point 602 to the screens are shown for several critical points. These distances are commonly referred to as eye relief and it is desirable to minimize the variation in these distances as encountered by the viewer in order to reduce the change in accommodation required to focus on the detail found at different points in the wide field of view afforded by the display system. As can be seen, the distance from observer's eye-point 602 to flat screen 604 is greater at each point than the distance from eye-point to curved screen 606. For example, the distance from eye-point 602 to flat screen 604 at point 608 is 1527 millimeters. However, the distance from observer's eye-point 602 to corresponding point 610 on curved screen 606 is only 1246 millimeters. This is a difference of approximately 281 millimeters in distance from the viewer's eye-point to the flat screen versus the distance from the viewer's eye-point to the corresponding point on the curved screen.

In addition, the resolution of a given display system can be improved by utilizing a projector with a greater number of pixels. In other words, if projectors are being used that provide a 20/40 acuity configuration, a 20/20 acuity configuration can be achieved by replacing the projectors with the lower number of pixels with projectors having a higher number of pixels. Thus, this embodiment allows a user to easily upgrade the display system image to full two (2) arc-minute resolution by performing a simple projector exchange.

Figure 7:
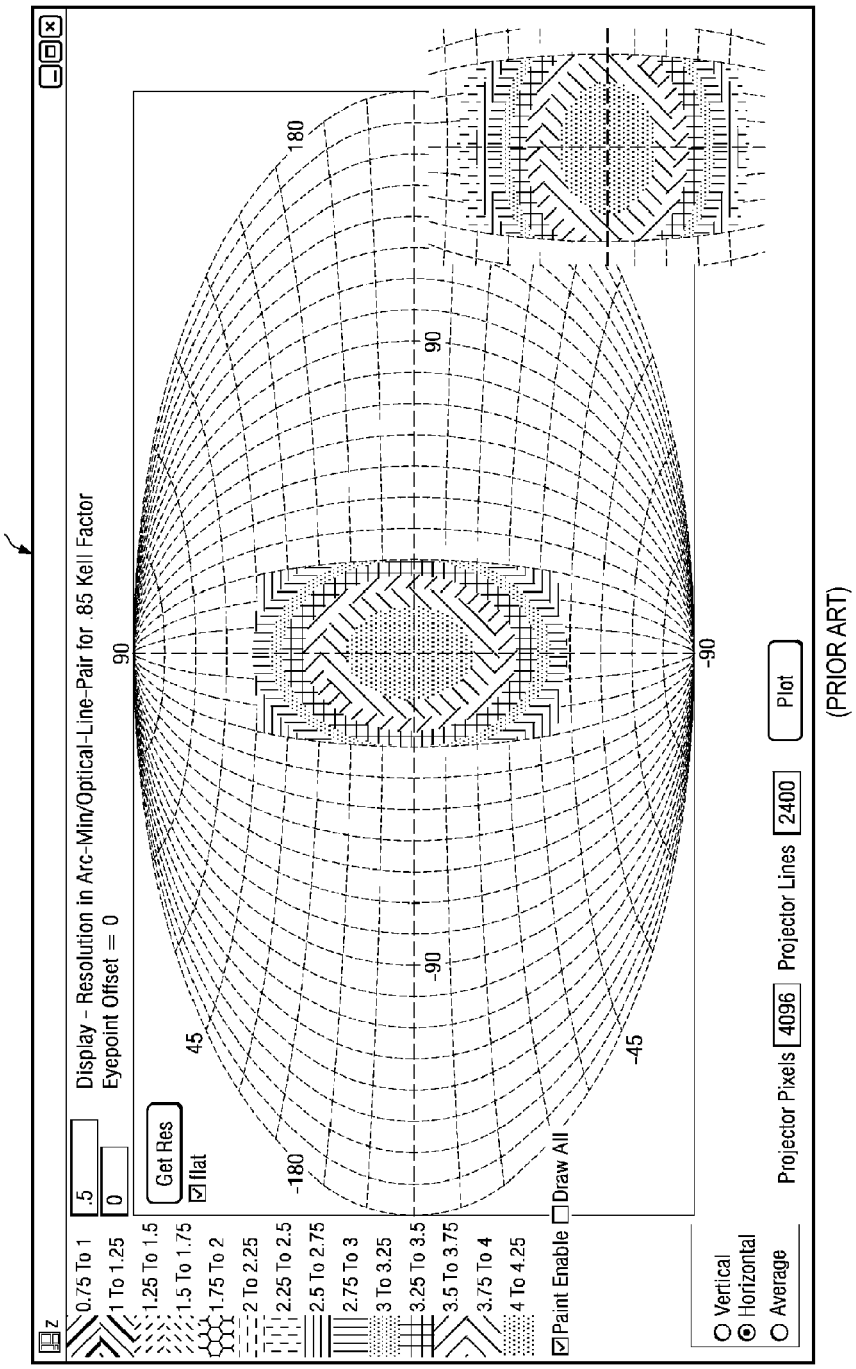
FIG. 7 is a graph illustrating a horizontal resolution for a flat screen distance in accordance with the prior art.

FIG. 7 is a block diagram illustrating a horizontal resolution for a prior art flat screen distance. FIG. 7 shows a horizontal resolution for a flat screen associated with a particular projector used to display a field of view that is 60 degrees wide and 50 degrees up by 45 degrees down as viewed from the design eye-point.

Display resolution 700 shows a display resolution in arc-minutes per optical line pair. In optical line pairs, a black line is displayed with a white line. The resolution indicates how many black line and white line pairs can be distinguished by a viewer assuming that the projector provides a particular number of pixels and that the line pairs displayed have been pre-filtered to reduce aliasing to an acceptable level such that the indicated resolution is discernible for any phasing of the line pairs vs. the pixel structure of the projectors. At 4096 pixels and 2400 projector lines, the horizontal and vertical resolution for a flat screen having a full field of view display image varies across the screen.

Figure 8:
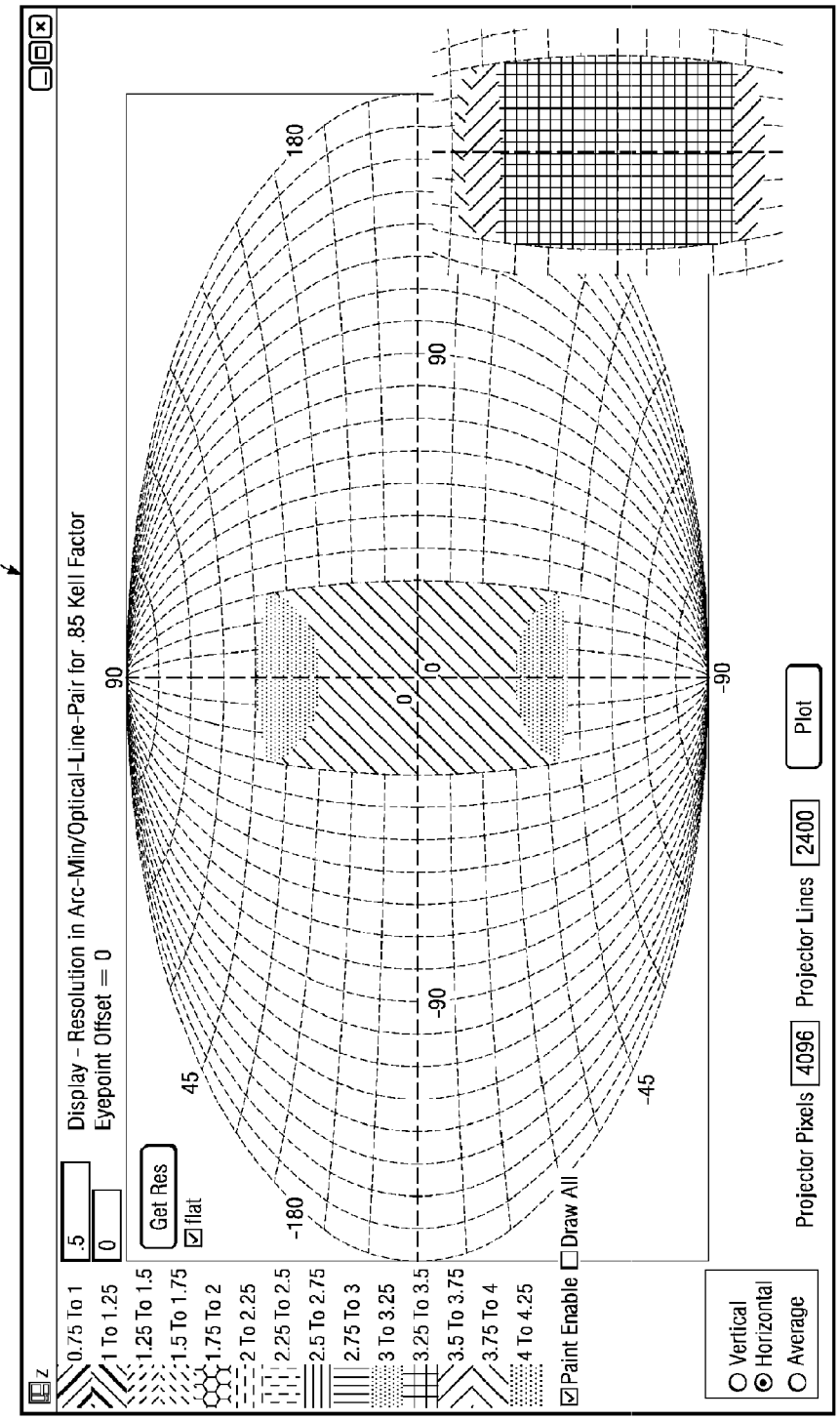
FIG. 8 is a graph illustrating a horizontal resolution for a curved screen distance in accordance with an advantageous embodiment.

FIG. 8 is a block diagram illustrating a horizontal resolution for a constant vertical resolution curved screen in accordance with the embodiments presented herein and using the same projector and image generator, and having the same field of view from the design eye-point as for the prior art flat screen shown in FIG. 7 above. Display resolution 800 shows a display resolution in arc-minutes per optical line pair. At 4096 pixels and 2400 projector lines, the horizontal resolution for a slightly curved screen having a full field of view display image is nearly uniform across the screen. In addition, the worst case horizontal resolution for the optimally curved screen plotted in FIG. 8 are significantly better than the worst case horizontal resolution plotted for the flat screen shown in FIG. 7 above.

Figure 9:
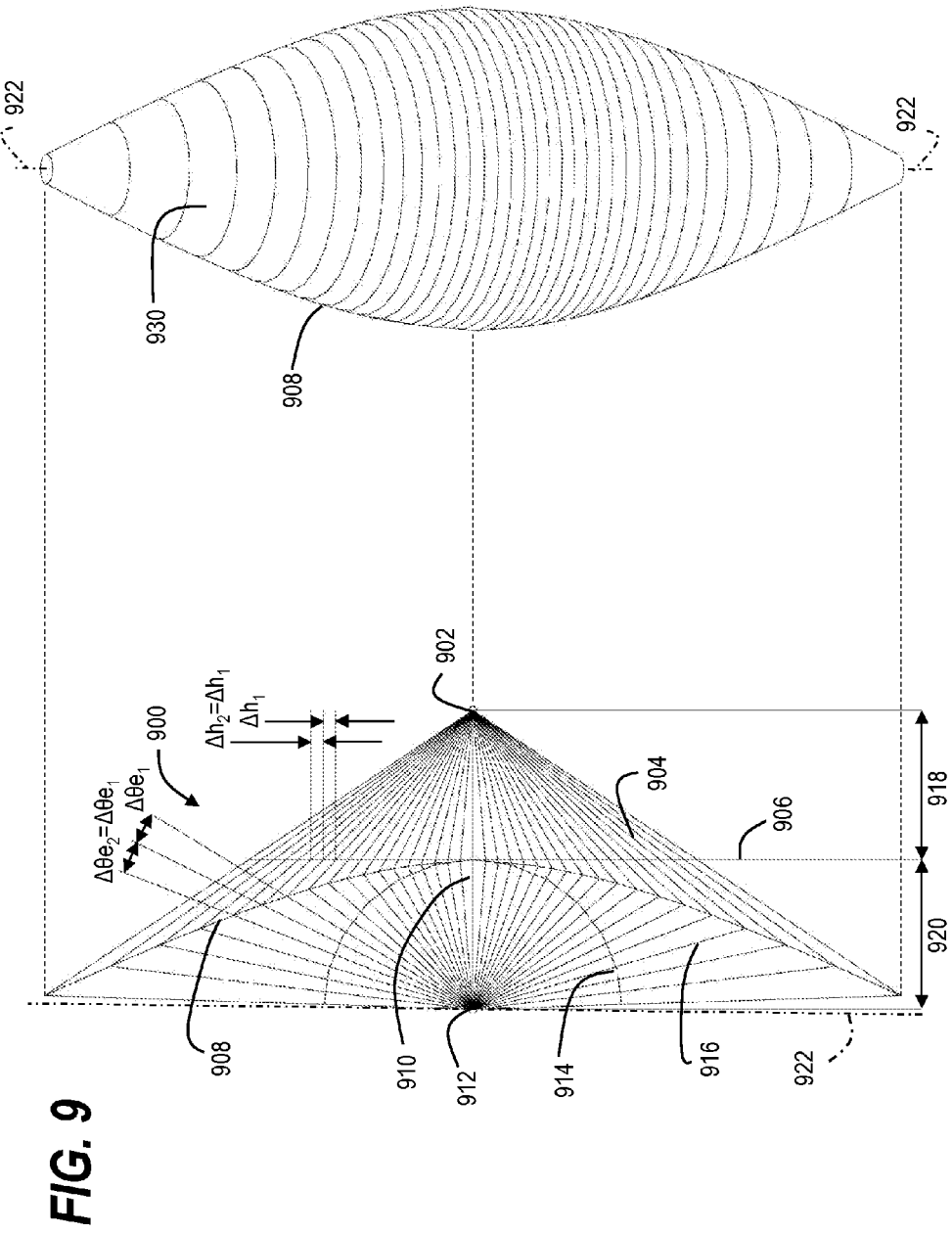
FIG. 9 illustrates another embodiment of creating a constant vertical resolution curvature screen surface.

FIG. 9 illustrates another embodiment of creating a constant vertical resolution curvature screen surface, similar to FIG. 4. Projection geometry 900 is a diagram of an image projected onto a constant vertical resolution curvature screen to generate an image with constant vertical resolution. Conventional projection lens at point 902 is implemented as any type of known or available projection lens for projecting an image onto a rear projection screen by projecting an image from an image origin, (not shown, similar to lens 406 in FIG. 4), generated by a fixed, rectangular array of sources, such as pixels in fixed matrix format projector.

Equal height projection rays 904 are projected from an image origin via the projection lens 902 and are separated by a fixed distance Δh. The equally spaced heights of rays 902 projected from image origin intersect plane 906 defined as being tangent to a constant vertical resolution screen surface curve 908 and intersecting a centerline 910 defined between the projection lens 902 and an eye-point 912. Plane 906 represents a flat rear projection screen as representatively illustrated in FIG. 2. The constant vertical resolution screen surface curve 908 represents a cross section of a constant vertical resolution curvature rear projection screen. Curve 914 represents the location of a traditional curved projection screen with a constant radial distance to design eye-point 912 as representatively illustrated in FIG. 3. Design eye-point 912 is the point at which an observer might observe the image displayed on a flat screen at plane 906, the constant vertical resolution screen surface curve 908 or the traditional curved projection screen 914. The equal angular rays 916 separated by a fixed angular distance 40e from eye-point 912 are intersected with the equal height rays 904 to form a locus of points defining the constant vertical resolution screen surface curve 908.

Thus, as similarly shown in FIG. 4, there is an optimum screen curvature shown for a constant vertical resolution screen surface curve 908 such that equal distances in the format of the projector's imaging chip, (similar to reference number 404 of FIG. 4), are mapped onto equal angles for the viewing position at design eye-point 912. The constant vertical resolution screen surface curve 908 is therefore defined as a function of elevation in a vertical direction relative to the design eye-point 912, and can be approximated to a high degree of accuracy by an arc of a radius, (similar to point 420 in FIG. 4) larger than the distance from the design eye-point 912 to the plane 906 and that varies with projector distance. FIG. 9 illustrates, for clarity purposes, a distance 918 from the projector lens at point 902 to the intersect plane 906 being equal to distance 920 from the design eye-point 912 to the intersect plane 906. However, these distances may vary according to the design requirements of the constant vertical resolution curvature screen surface and the information presented above with respect to FIG. 5.

The constant vertical resolution screen surface curve 908 is then rotated about a vertical axis 922 that passes through the center of the design eye-point 912 to create a constant vertical resolution curvature screen surface solid 930 having a circular cross section in a vertical direction normal to its vertical axis 922. From this solid 930, various sections thereof may have an image projected upon the respective sections from a position consonant with a projection lens at 902. Additionally, the constant vertical resolution curvature screen surface solid 930 may be fabricated from a number of screen pieces, or a tessellation of joined screens that together form the totality of the constant vertical resolution curvature screen surface solid 930.

FIGS. 10A-10C illustrate another embodiment of a constant vertical resolution curvature screen surface 1000 that receives an image from a single projection device although multiple projection devices may be used on other portions of the screen surface 1000 as shown in FIGS. 11A-11B below. FIG. 10A illustrates side-view of a constant vertical resolution curvature screen surface solid 1000 comprising a partial portion of the constant vertical resolution curvature screen surface solid 930 of FIG. 9. Likewise, FIGS. 10B and 10C illustrate top and isometric views of the constant vertical resolution curvature screen surface solid 1000, respectively. A representative image projector 1002 projects an image upon a section of the constant vertical resolution curvature screen surface solid 1000 as illustrated by the constant vertical ray projection lines 1004 that are separated by equal lateral distances represented by vertical intersect plane line 1006, and constant horizontal ray projection lines 1008 that are separated by equal lateral distances represented by horizontal intersect plane line 1010.

FIG. 10C additionally illustrates a top screen surface 1020, an azimuth curve 1030 defined by circle at the intersection of the top screen surface 1020 and the lateral sides of the constant vertical resolution curvature screen surface 1000. The top screen surface 1020 may be flat, as shown in FIG. 10C, or may have a constant resolution curvature (not shown) in two orthogonally oriented directions, that is, a horizontal direction and a vertical direction with respect to a corresponding image projector, (see for example, image projector 1150 in FIGS. 11A-11B). The constant vertical resolution screen surface curve 1040 is representatively illustrated by the intersection of the constant vertical ray projection lines 1004 and the constant vertical resolution curvature screen surface 1000. The constant vertical resolution screen surface 1000 may include a number of constant vertical resolution screen surfaces 1050, 1060, 1070 and 1080 that are butt-joined at their respective lateral edges, collectively illustrated as reference number 1090, to create the overall constant vertical resolution curvature screen surface 1000. This tessellation of constant vertical resolution screen surfaces 1050, 1060, 1070 and 1080 that creates the composite constant vertical resolution curvature screen surface 1000 maintains the constant vertical resolution screen surface curve 1040 at and through the joined lateral edges 1090 of each of the constant vertical resolution screen surfaces 1050, 1060, 1070 and 1080.

FIGS. 11A-11B illustrate another embodiment of a constant vertical resolution curvature screen surface, as shown in FIGS. 10A-10C, used to receive a number of images thereon from a number of projection devices. FIG. 11A illustrates a constant vertical resolution curvature screen surface solid 1100 similar to constant vertical resolution curvature screen surface solid 1000 of FIGS. 10A-10C. The constant vertical resolution curvature screen surface solid 1100 may be fabricated from a number of constant vertical resolution curvature screen surfaces 1102, 1104, 1106, etc., that is a tessellation of screens that once attached together form the totality of the constant vertical resolution curvature screen surface solid 1100. Each of the constant vertical resolution curvature screen pieces may be joined at longitudinal side edges to form a seamless screen surface to substantially eliminate any dimensional incongruity thus providing a constant vertical resolution curvature screen for receiving the projected images on the outer surface of the screen while observed the inside at the design eye-point, as similarly described in FIGS. 10A-10C. This tessellation of constant vertical resolution screen surfaces that create the composite constant vertical resolution curvature screen surface 1100 maintains the constant vertical resolution screen surface curve at and through the joined lateral edges of each of the constant vertical resolution screen surfaces, as similarly described in FIGS. 10A-10C.

FIG. 11B illustrates four exemplary image projectors 1110, 1120, 1130 and 1140 are positioned at equal angular intervals around the constant vertical resolution curvature screen surface solid 1100 to project images thereon in a horizontal direction as illustrated by the constant vertical ray projection lines 1160 that are separated by equal lateral distances represented by vertical intersect plane line 1165, and constant horizontal ray projection lines 1170 that are separated by equal lateral distances represented by horizontal intersect plane line 1175.

A vertical fifth image projector 1150 is positioned in a vertical direction above the constant vertical resolution curvature screen surface solid 1100 and projects an image having constant vertical and horizontal ray projection lines 1180 upon the top screen surface 1152. The top screen surface 1152 may be flat, as shown in FIGS. 11A-11B, or may have a constant resolution curvature (not shown) in two orthogonally oriented directions, that is, a horizontal direction and a vertical direction with respect to the corresponding image projector 1150. Any number of image projectors may be used to project visual images on the any corresponding surface of the constant vertical resolution curvature screen surface solids 1100, 1000 or 930, or multiple image projectors may project images on the same region of the constant vertical resolution curvature screen surface solid 1100 based on the design needs of the projection system.

In summary, a visual image projection and display system, for example, represented by FIGS. 11A-11B, may include a tessellation of constant vertical resolution surfaces 1100 to display a single substantially constant vertical resolution image by blending projected images from image projectors, e.g., 1110-1140, on adjacent constant vertical resolution surfaces, wherein each constant vertical resolution surface, e.g., 1102, 1104, 1106, etc., is defined by any horizontal section of the constant vertical resolution surface 1100 normal to a central vertical axis 922 (of FIG. 9) of the tessellation of constant vertical resolution surfaces 1100 being a constant distance from the central vertical axis 922. A top screen surface 1152 intersecting the tessellation of constant vertical resolution surfaces 1100 is defined by a circular azimuth curve 1154, and a set of image projectors 1110-1150 correspond to each respective constant vertical resolution surface, e.g., 1102, 1104, 1106, etc., of the tessellation of constant vertical resolution surfaces 1100 and the top surface screen 1152.

Each constant vertical resolution surface being defined by at least a portion of a constant vertical resolution elevation curve, (908 of FIG. 9), being rotated about at least a portion of the central vertical axis 922 of the tessellation of constant vertical resolution surfaces 930, 1000 and 1100. The constant vertical resolution elevation curve 908 being based on a locus of points defined by an intersection of a set of equal angular increment lines 916 of a viewing distance from an eye-point 912 of the viewer to an inside surface of at least one constant vertical resolution surface 908 in a direction of at least one image projector with a set of equal pixel size increment lines 904 of a projected image from an image projector 902 based on a projection distance 918 from the image projector 902 to an outside surface of the at least one constant vertical resolution surface 908 in a direction of the eye-point 912 of the viewer.

The set of equal angular increment lines 916 are further defined by the viewing distance 920 from the eye-point 912 of the viewer being rotated in a vertical direction. The set of equal pixel size increment lines 904 are further defined by being constrained to a vertical plane 906 both at and normal to the projection distance 918 from the image projector 902. The tessellation of constant vertical resolution surfaces 1100 that display a single substantially constant vertical resolution image may be being utilized in a vehicle simulator for aircraft, land vehicles or any other environment where accurate visual imaging is needed for simulation purposes.

Figure 12:
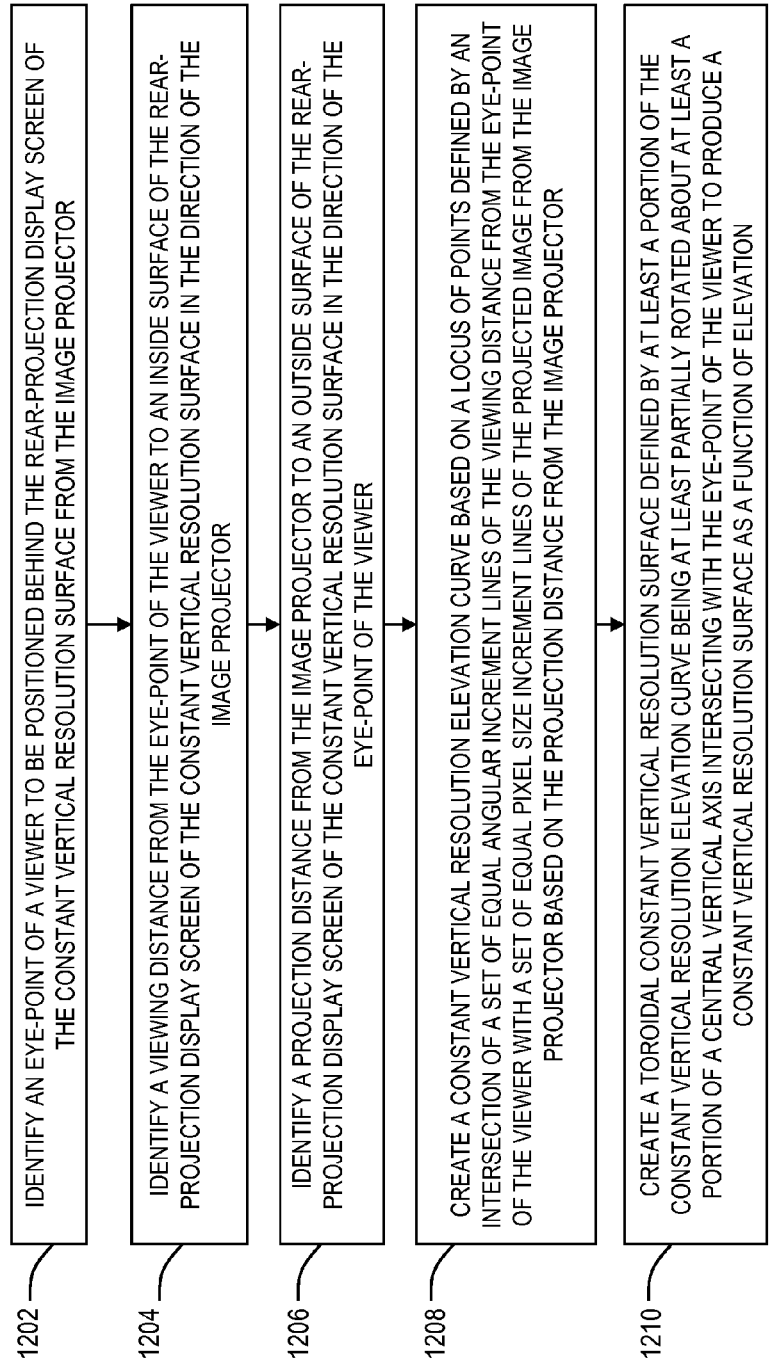
FIG. 12 is a logic flowchart illustrating a process for creating a constant vertical resolution display screen surface in accordance with the embodiments presented.

FIG. 12 is a logic flowchart illustrating a process for creating a constant vertical resolution display screen surface in accordance with the embodiments presented. The process includes identifying 1202 an eye-point of a viewer to be positioned behind the rear-projection display screen of the constant vertical resolution surface from the image projector. A viewing distance from the eye-point of the viewer to an inside surface of the rear-projection display screen of the constant vertical resolution surface is identified 1204 in the direction of the image projector. A projection distance from the image projector to an outside surface of the rear-projection display screen of the constant vertical resolution surface is identified 1206 in the direction of the eye-point of the viewer.

A constant vertical resolution elevation curve 908, (of FIG. 9), is then created 1208 based on a locus of points defined by an intersection of a set of equal angular increment lines 916 of the viewing distance from the eye-point 912 of the viewer with a set of equal pixel size increment lines 904 of the substantially constant vertical resolution projected image from the image projector at 902 based on the projection distance 918 from the image projector. The constant vertical resolution surface 930 is created 1210 being defined by at least a portion of the constant vertical resolution elevation curve 908 being at least partially rotated about at least a portion of a central vertical axis 922 intersecting the eye-point of the viewer 912 to produce a constant vertical resolution surface as a function of elevation.

The set of equal angular increment lines 916 are further defined by the viewing distance 920 from the eye-point 912 of the viewer being rotated in a vertical direction. The set of equal pixel size increment lines 904 are further defined by being constrained to a vertical plane 906 both at and normal to the projection distance 918 from the image projector at 902. The constant vertical resolution surface 930 further being defined by any horizontal section of the constant vertical resolution surface normal to the central vertical axis 922 being a constant distance from the central vertical axis.

The process further includes joining a number of the constant vertical resolution surfaces, 1102, 1104, 1106, etc., at their vertical edges to create a constant vertical resolution surface structure 1100, where each constant vertical resolution surface of the constant vertical resolution surface 1100 structure is capable of receiving and displaying a substantially constant vertical resolution projected image from an image projector, e.g., 1110-1140. The constant vertical resolution surface structure further being defined by any horizontal section of the constant vertical resolution surface structure normal to the central vertical axis 922 being a constant distance from the central vertical axis.

Figure 13:
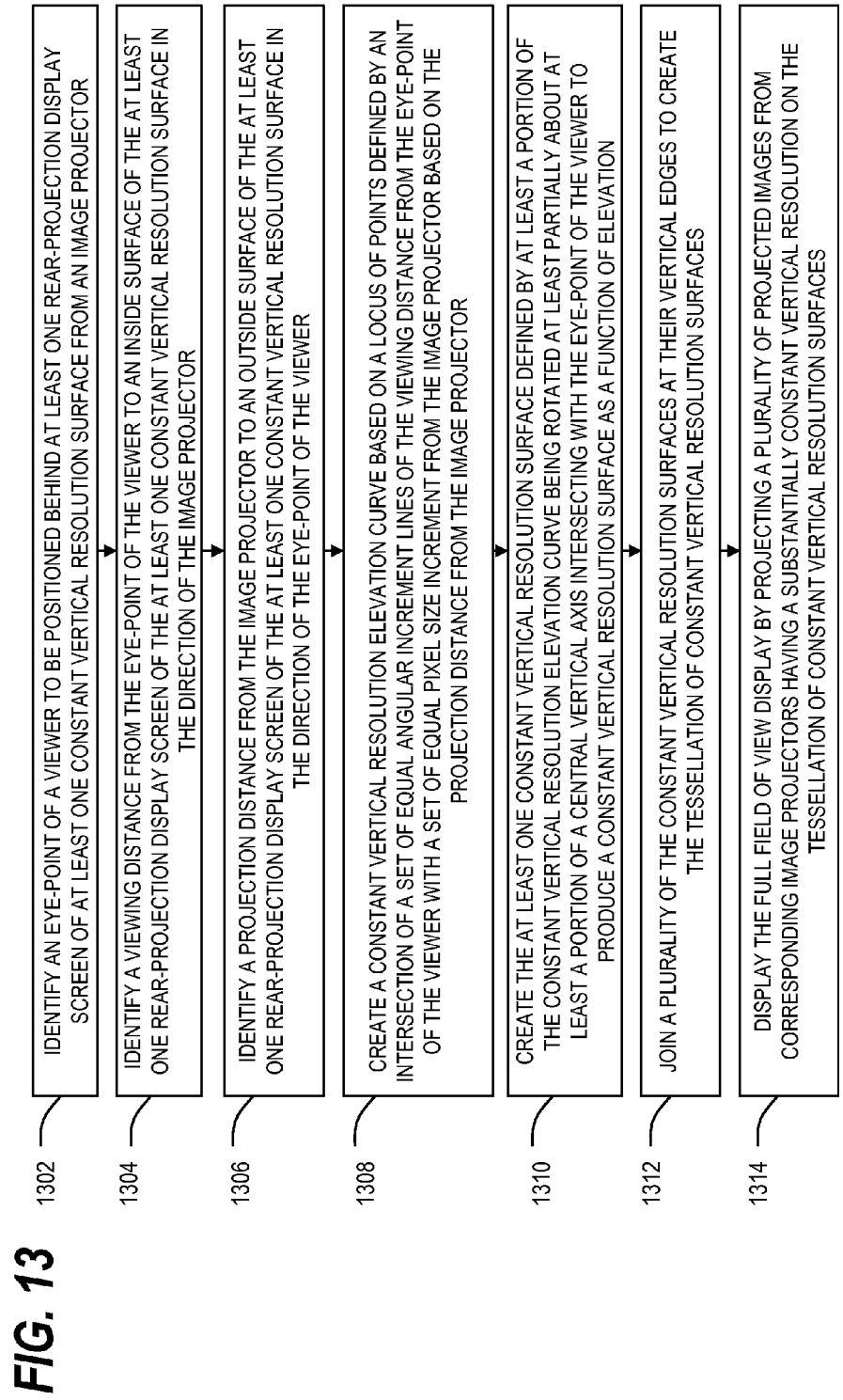
FIG. 13 is a logic flowchart illustrating another process for producing a full field of view display with a constant vertical resolution on a tessellation of constant vertical resolution surfaces in accordance with the embodiments presented.

FIG. 13 is a logic flowchart illustrating a process for creating a constant vertical resolution display screen surface in accordance with the embodiments presented. A process that produces a full field of view display with a constant vertical resolution on a tessellation of constant vertical resolution surfaces acting as rear-projection display screens that receive and display substantially constant vertical resolution projected images from corresponding image projectors includes identifying 1302 an eye-point 912 of a viewer to be positioned behind at least one rear-projection display screen 908 of at least one constant vertical resolution surface 930 from an image projector at 902. A viewing distance 920 from the eye-point 912 of the viewer to an inside surface of the at least one rear-projection display screen of the at least one constant vertical resolution surface 908 is identified 1304 in the direction of the image projector at 902. A projection distance 918 from the image projector to an outside surface of the at least one rear-projection display screen 908 of the at least one constant vertical resolution surface is identified 1306 a in the direction of the eye-point 912 of the viewer.

A constant vertical resolution elevation curve 908 is created 1308 based on a locus of points defined by an intersection of a set of equal angular increment lines 916 of the viewing distance 920 from the eye-point 912 of the viewer with a set of equal pixel size increment lines 904 of the substantially constant vertical resolution projected image from the image projector 902 based on the projection distance 918 from the image projector at 902. At least one constant vertical resolution surface 930 is created 1310 being defined by at least a portion of the constant vertical resolution elevation curve 908 being at least partially rotated about at least a portion of a central vertical axis 922 constant vertical resolution intersecting with the eye-point of the viewer to produce a constant vertical resolution surface as a function of elevation. The the constant vertical resolution surfaces are joined 1312 at their vertical edges to create the tessellation of constant vertical resolution surfaces, and the full field of view display is displayed 1314 by projecting a number of projected images from corresponding image projectors having a substantially constant vertical resolution on the tessellation of constant vertical resolution surfaces.

The flowcharts and block diagrams in the different depicted embodiments illustrate the architecture, functionality, and operation of some possible implementations of the apparatus and methods. The function or functions noted in the flowchart operations may occur out of the order noted in the figures. For example, in some cases, two operations shown in succession may be executed substantially concurrently, or the operations may sometimes be executed in the reverse order, depending upon the operation involved.

The set of equal angular increment lines 916 are further defined by the viewing distance 920 from the eye-point 912 of the viewer being rotated in a vertical direction. The set of equal pixel size increment lines 904 are further defined by being constrained to a vertical plane 906 both at and normal to the projection distance 918 from the image projector at 902. The tessellation of constant vertical resolution surfaces e.g., 930, 1000, 1100, is further defined by any horizontal section of the tessellation of constant vertical resolution surfaces normal to the central vertical axis 922 being a constant distance from the central vertical axis.

The method further includes providing a top surface screen 1152 intersecting the tessellation of constant vertical resolution surfaces 1100 defined by a circular azimuth curve 1154. The method further includes blending images projected on adjacent constant vertical resolution surfaces, e.g., 1102, 1104, 1106, etc., generated by the corresponding image projectors 1110-1140 to produce a single substantially constant vertical resolution image on the tessellation of constant vertical resolution surfaces 1100. The corresponding image projectors 1110-1150 may generate images formatted with an aspect ratio of approximately sixteen by nine.

The constant vertical resolution display screen provides more constant vertical resolution than either prior art flat screens or dome shaped screens. Consequently, it also produces a better worst case resolution for a given field of view from the viewer eye-point and a given number of pixels arranged across that field of view. This is obvious because in a non-constant vertical resolution display there are variations in resolution such that some parts of the display are better than the average of the resolution at all of the parts of the display whereas on a uniform or nearly constant vertical resolution display all parts have resolution equal to or very near the average resolution. This is important to the design of a visual simulator for pilot training because the part of the display in which important visual detail will appear in a training scenario cannot be predicted in advance. Therefore the visual display system must be designed so that all parts of the display meet or exceed the worst case resolution value that has been determined to be required for performance of the most critical training tasks. The constant vertical resolution wide field of view display system described herein can provide that critical worst case resolution with fewer pixels and hence at lower cost than any other display system.

The display system of the advantageous embodiments described herein provides an improved vehicle simulator visual imaging. The display system may also be used in vehicle flight simulator, driver simulators, marine simulators, and other simulation devices. The display system may be used for improved training of pilots, drivers, mechanics, flight crew, and other personnel. The display system may also be used for design and development of vehicles and aircraft. In addition, the display system may also be used for education, such as in planetariums, as well as in entertainment.

An advantageous embodiment creates an eye-limited 2 arc-minute resolution or nearly eye-limited 4 arc minute, full field of view display system depending only upon the choice of projectors used. It efficiently tiles the full field of view of an air combat training visual display system with modern display high definition aspect ratio projectors and optimizes resolution uniformity with a minimum of wasted pixels.

The embodiments described herein solve the problem of inefficient utilization of image generator and display pixels when these pixels are projected by fixed matrix projectors, such as high definition format liquid crystal on silicon (LCoS) or digital light processing (DLP), rather than analog projectors, such as cathode ray tube (CRT), to form a continuous full field of view image on a rear projection screen for viewing by a pilot in a flight simulator.

The embodiments described herein provide more efficient use of projector and image generator pixels than is available today from existing solutions. This is accomplished by optimizing screen shape and curvature for high definition format projectors. Efficient use of pixels is important because such pixels are very expensive to procure and to support, and as a result, the visual system may drive the cost of fielding and supporting a mission-training center more than any other subsystem. The display system also provides increased modularity, that reduces procurement costs and support costs. The display systems are also well suited to applications that require integration with helmet displays and night vision goggles.

Figure 14:
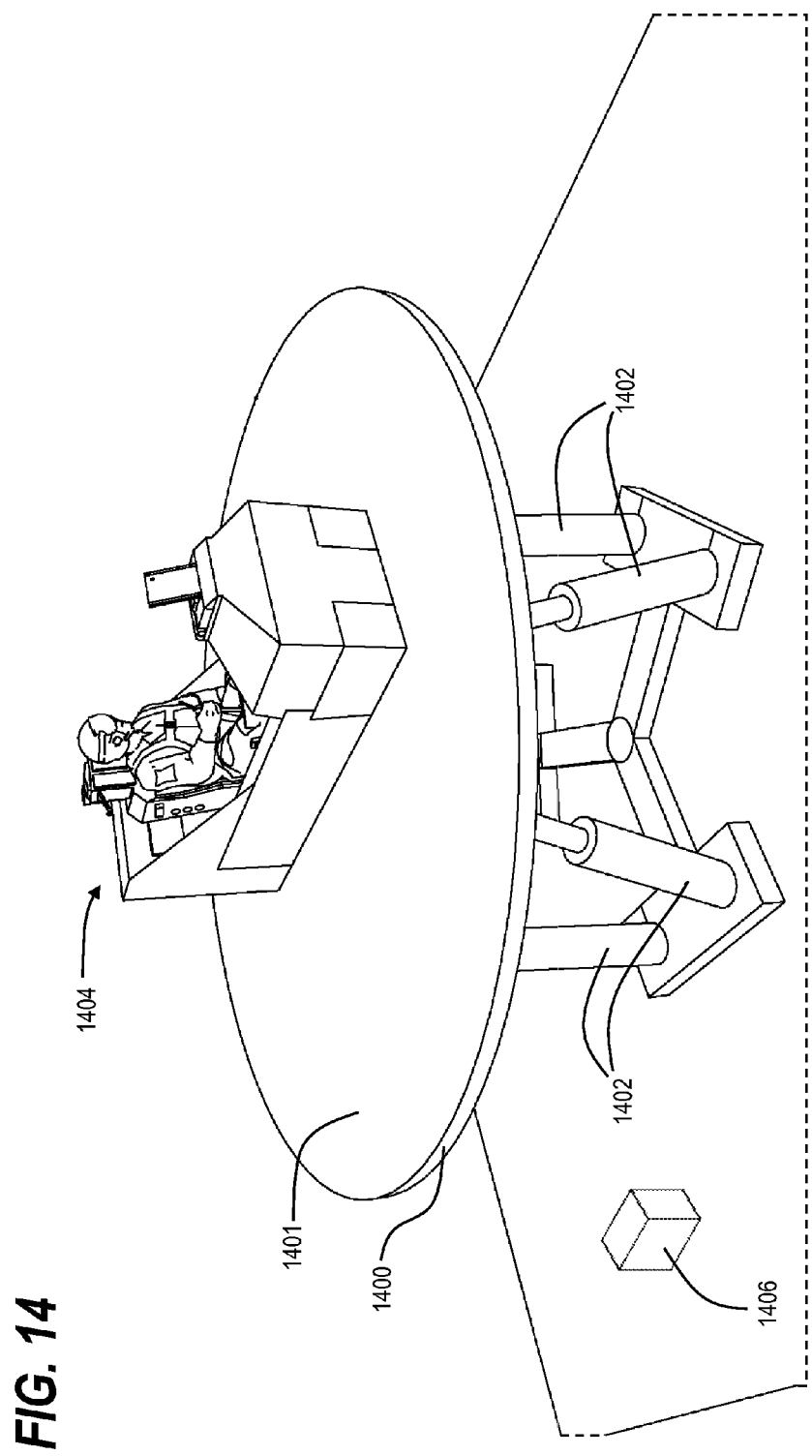
FIG. 14 illustrates a schematic representation of a motion platform having a simulated vehicle cockpit mounted thereon in accordance with the embodiments presented.

FIG. 14 illustrates a schematic representation of a motion platform 1400 supported by motion platform actuators 1402 having a simulated vehicle cockpit 1404 mounted on an upper surface 1401 of the motion platform 1400. The simulated vehicle cockpit 1404 may also be a simulated ship bridge, a simulated land vehicle cabin or any other command and control center for a vehicle that is suitable for use in a vehicle simulator. The movement of the motion platform 1400 is accomplished by the motion platform actuators 1402 that may be hydraulically controlled actuators responding to signals from a vehicle simulator control system 1406.

Figure 15:
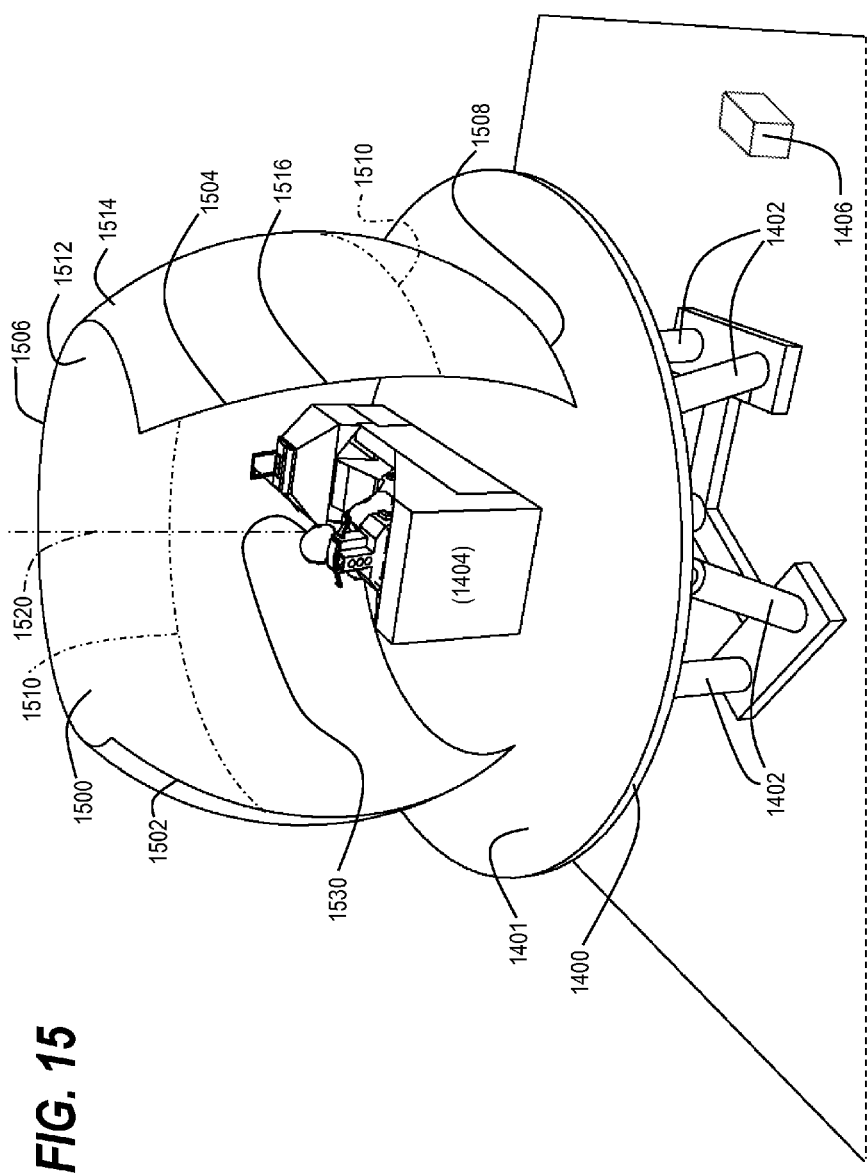
FIG. 15 illustrates a schematic representation of the motion platform of FIG. 14 having a toroidal constant vertical resolution rear projection display screen surrounding the simulated vehicle cockpit in accordance with the embodiments presented.

FIG. 15 illustrates a schematic representation of the motion platform 1400 of FIG. 14 having a toroidal constant vertical resolution rear projection display screen 1500 surrounding the simulated vehicle cockpit 1404. The toroidal constant vertical resolution rear projection display screen 1500 is similar to the constant vertical resolution curvature screen surface 1000 illustrated in FIGS. 10A-10C and constant vertical resolution curvature screen surface solid 1100 illustrated in FIGS. 11A-11B with the exception of the toroidal constant vertical resolution rear projection display screen 1500 including a left rear edge 1502 and a right rear edge 1504 of toroidal constant vertical resolution rear projection display screen 1504 allowing the simulated vehicle cockpit 1404 to be moved into and out of position relative to an enclosed area defined by an interior portion of the toroidal constant vertical resolution rear projection display screen 1500. The toroidal constant vertical resolution rear projection display screen 1500 in this exemplary configuration may cover a horizontal field-of-view of approximately 220-degrees.

Additionally, a top edge of toroidal constant vertical resolution rear projection display screen 1506 may provide a horizontal field-of-view of approximately 37.5-degrees in an upward direction from the horizontal direction of the eye-point, while a bottom edge of toroidal constant vertical resolution rear projection display screen 1508 may provide approximately a horizontal field-of-view of approximately 40-degrees in a downward direction from the horizontal direction of the eye-point. The toroidal constant vertical resolution rear projection display screen 1500 is further illustrated having convex portion 1512 that receives an image from an image projector and a concave portion 1514 that is viewed by a viewer at the design eye-point 1530. A horizontal eye-point line 1510 illustrates the plane where the design eye-point 1530 is located within and that is intersected by a central vertical axis 1520 and illustrates the vertical intersecting line of the design eye-point illustrated at reference number 420 in FIG. 4 and reference number 912 in FIG. 9.

Figure 16:
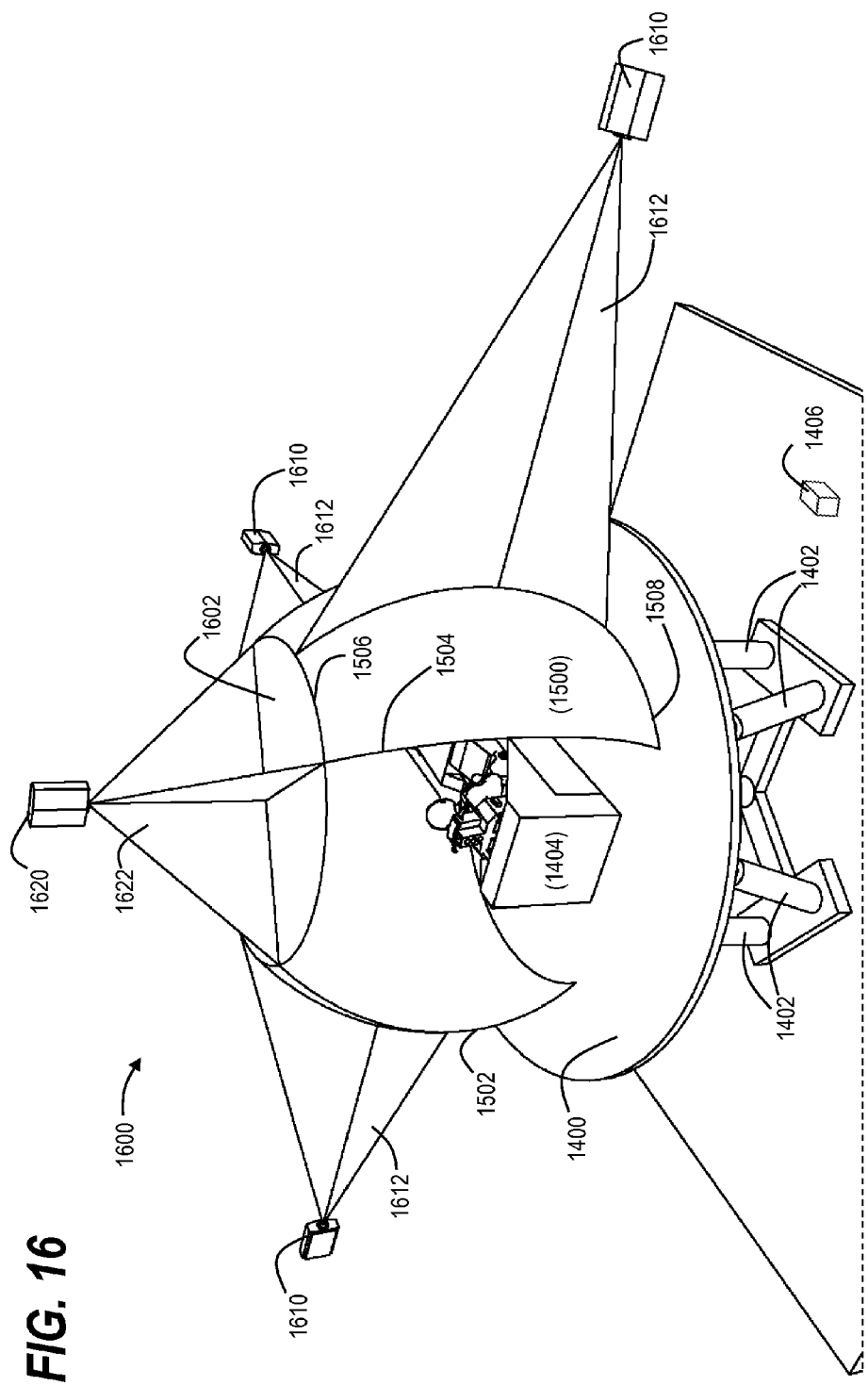
FIG. 16 illustrates a schematic representation of the motion platform of FIGS. 14-15 having multiple image projectors projecting images on the toroidal constant vertical resolution rear projection display screen surrounding the simulated vehicle cockpit and a top screen surface in accordance with the embodiments presented.

FIG. 16 illustrates a schematic representation of an exemplary projecting system 1600 including the motion platform 1400 of FIGS. 14-15 and multiple image projectors 1610 and 1620 capable of projecting images on the toroidal constant vertical resolution rear projection display screen 1500 and a top screen surface 1602 surrounding and partially enclosing the simulated vehicle cockpit 1404. In this exemplary configuration, a set of three horizontal image projectors 1610 project a horizontally projected image onto a vertical portion of the toroidal constant vertical resolution rear projection display screen 1500 along the illustrated horizontal image projector ray projection lines 1612. The top screen surface 1602 is joined to the top edge 1506 of toroidal constant vertical resolution rear projection display screen 1500 and is configured to have a vertical image projector 1620 project a downward projected image onto the top screen surface 1602 along the illustrated vertical image projector ray projection lines 1622. The vehicle simulator control system 1406 may control the images projected from all image projectors and provide motion to the simulated vehicle cockpit 1404 through the motion platform actuators 1402. The projectors 1610 and 1620 may be conventionally attached to the motion platform 1400 (not shown for clarity purposes) so that they move in conjunction with the movement of the motion platform 1400 while the simulated vehicle cockpit 1404 is in a simulation environment under control of the vehicle simulator control system 1406.

In summary, the vehicle simulation system of FIG. 16 includes a vehicle simulator control system 1406, a motion platform 1400 capable of responding to motion signals from the vehicle simulator control system 1406, a simulated vehicle cockpit or control center 1404 mounted to the motion platform 1400, and a visual display system 1600 mounted to the motion platform 1400 and substantially surrounding the simulated vehicle control cockpit or center 1404. The visual display system 1600 includes image projectors 1620 capable of projecting a simulated visual display around the simulated vehicle cockpit or control center 1404, and an image projection screen 1500 capable of receiving the simulated visual display from the image projectors 1620 on a convex portion 1512 of the image projection screen 1500. The image projection screen 1500 is a toroidal constant vertical resolution surface defined by a constant vertical resolution elevation curve 1516 being at least partially rotated about at least a portion of a central vertical axis 1520 intersecting with a design eye-point 1530 of a viewer relative to the simulated vehicle cockpit or control center 1404 to produce the toroidal constant vertical resolution surface in a vertical direction as a function of elevation.

The toroidal constant vertical resolution surface 1500 is generated (as previously described in FIG. 4 and FIGS. 9-13), by identifying the design eye-point 1530 of the viewer being positioned on a concave portion 1514 of the toroidal constant vertical resolution surface of the image projection screen 1500, by identifying a viewing distance 920 (as shown in FIG. 9) from the design eye-point 1530 of the viewer to the concave portion 1514 of the toroidal constant vertical resolution surface of the image projection screen 1500 in a direction of a projected image from one of the image projectors 1620, and by identifying a projection distance 918 (as shown in FIG. 9) from one of the plurality image projectors to the convex portion 1512 of the toroidal constant vertical resolution surface of the image projection screen 1500 in a direction toward the design eye-point 1530 of the viewer. The toroidal constant vertical resolution surface is further generated by creating the constant vertical resolution elevation curve 1516 based on a locus of points defined by an intersection of a set of equal angular increment lines 916 (as shown in FIG. 9) of the viewing distance 920 (as shown in FIG. 9) from the design eye-point 1530 of the viewer with a set of equal pixel size increment lines of the projected image 904 (as shown in FIG. 9) from one of the image projectors 1620 based on the projection distance 918 (as shown in FIG. 9) from one of the image projectors 1620.

The set of equal angular increment lines 916 (as shown in FIG. 9) are further defined by the viewing distance 920 (as shown in FIG. 9) from the design eye-point 1530 of the viewer being rotated in a vertical direction, and the set of equal pixel size increment lines are further defined by being constrained to a vertical plane both at and normal to the projection distance 918 (as shown in FIG. 9) from one of the image projectors 1620.

The toroidal constant vertical resolution surface further being defined by any horizontal section of the toroidal constant vertical resolution surface normal to the central vertical axis 1520 being a constant distance from the central vertical axis 1520. A number of the toroidal constant vertical resolution surfaces 1102-1106 (as shown in FIG. 11A-11B) at their vertical edges may create the image projection screen 1500, wherein each of the toroidal constant vertical resolution surfaces of the image projection screen 1500 are capable of receiving and displaying a substantially constant vertical resolution projected image from one of the image projectors 1620. The image projection screen 1500 is further defined by any horizontal section of the image projection screen 1500 normal to the central vertical axis 1520 being a constant distance from the central vertical axis 1520.

Figure 17:
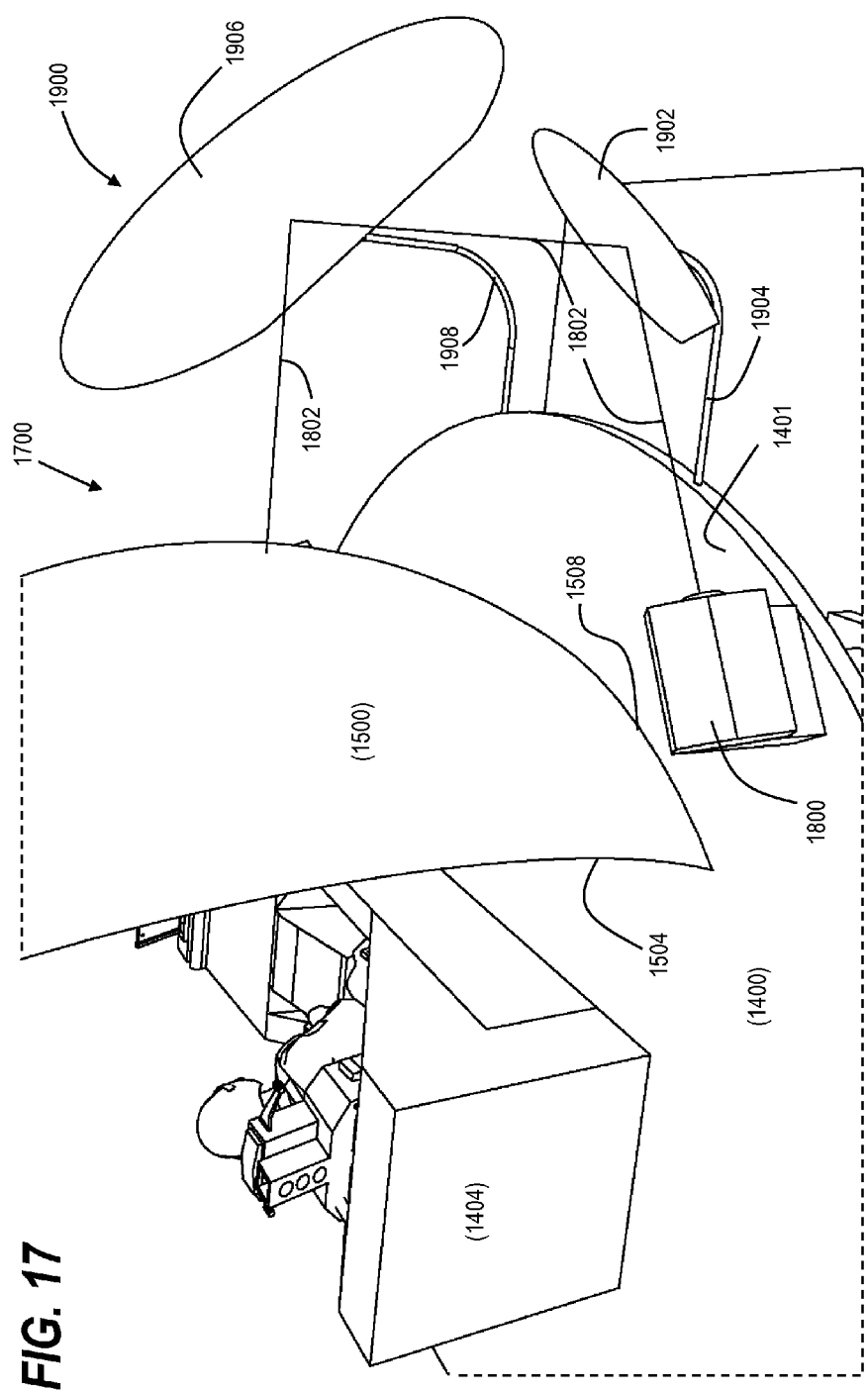
FIG. 17 illustrates a schematic representation of a motion platform mounted horizontal image projection assembly having a projector and mirror assembly for projecting an image onto the toroidal constant vertical resolution rear projection display screen in accordance with the embodiments presented.

FIG. 17 illustrates a schematic representation of a motion platform 1400 mounted horizontal image projection assembly 1700 having a motion platform mounted horizontal image projector 1800, and mirror assembly 1900 for projecting an image onto a portion of the toroidal constant vertical resolution rear projection display screen 1500. In this configuration, a motion platform mounted horizontal image projector 1800 is mounted proximate to the motion platform 1400, for example, on the upper surface 1401 of the motion platform 1400. The projector 1800 may also be mounted anywhere near a plane defined by the upper surface 1401 of the motion platform 1400 and proximate the toroidal constant vertical resolution rear projection display screen 1500 to improve stability of the image projector 1800 while in motion being closer to the axis of rotation and center of gravity of the motion platform and simulated vehicle cockpit 1404.

A first image mirror 1902 is attached to the motion platform 1400 via a first image mirror bracket 1904 that receives the projected image from the motion platform mounted horizontal image projector 1800. A second image mirror 1906 is attached to the motion platform 1400 via a second image mirror bracket 1908 that receives the projected image from the motion platform mounted horizontal image projector 1800 being reflected from the first image mirror 1902. The projected image follows the illustrated image projection centerline 1802 onto a portion of the outward facing surface of the toroidal constant vertical resolution rear projection display screen 1500. The first image mirror 1902 and/or the second image mirror 1906 may fold upon their respective image mirror brackets 1904 and 1908 to have the mirrors be stored in compact configuration when the simulator is not in use.

The motion platform mounted horizontal image projector 1800 may be mounted directly to the motion platform 1400 or adjacent to it, (not illustrated), and/or proximate to or within the plane defined by the upper surface 1401 of the motion platform 1400. These various configurations keep the motion platform mounted horizontal image projector 1800 closer to the center of translation and rotation applied to the motion platform by the motion platform actuators 1402 (as seen in FIGS. 14-15), responding to signals from the vehicle simulator control system 1406, to thereby minimizing translational and rotational stress on the motion platform mounted horizontal image projector 1800 as it moves while attached to the motion platform 1400. The first image mirror 1902 and the second image mirror 1906 may be attached, as illustrated, in a similar manner with respect to the motion platform 1400 to minimize the translational and rotational stress while attached to the motion platform 1400.

Figure 18:
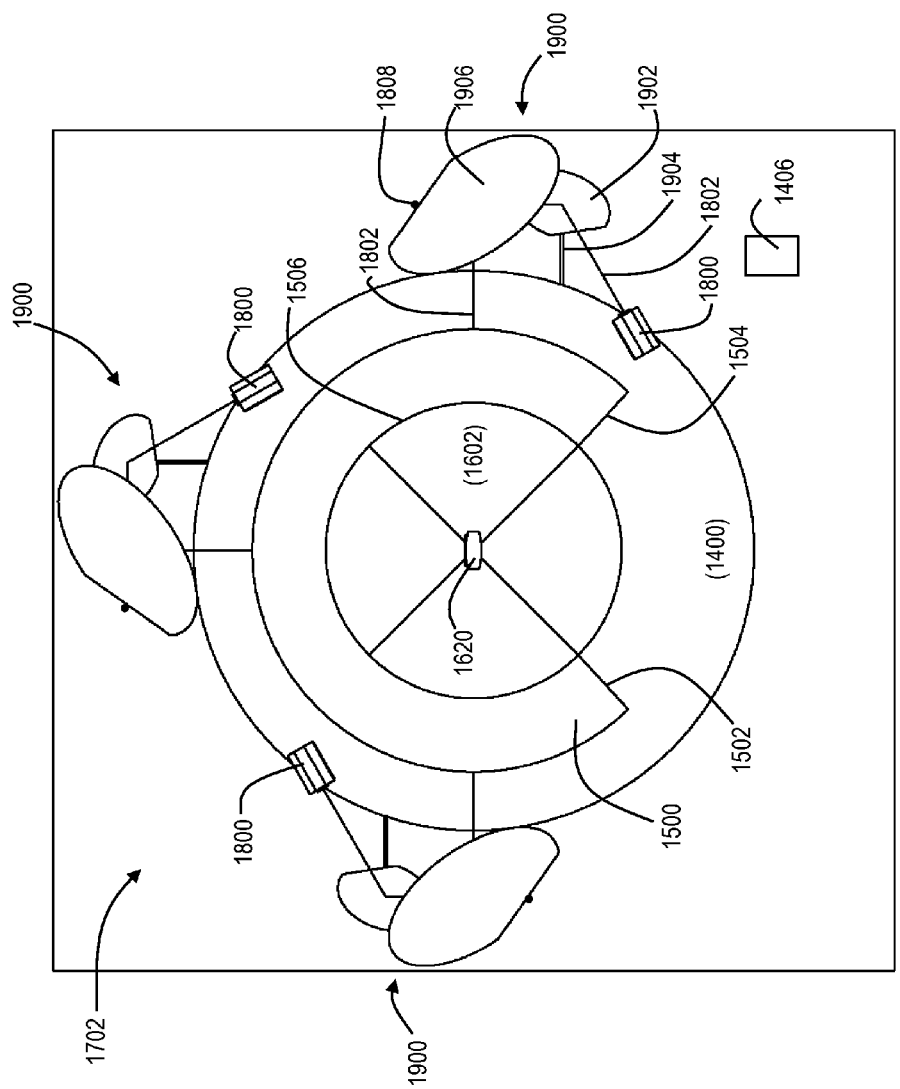
FIG. 18 illustrates a top view of a schematic representation of three motion platform mounted horizontal image projection assemblies having projectors and mirror assemblies for projecting three images onto the toroidal constant vertical resolution rear projection display screen in accordance with the embodiments presented.

FIG. 18 illustrates a top view of a schematic representation of a motion platform mounted horizontal image projection assembly 1702 including three motion image projectors 1800 mounted in a radial array around a center point of the motion platform 1400, and three corresponding motion platform mounted horizontal mirror assemblies 1900 for projecting multiple images onto portions of the toroidal constant vertical resolution rear projection display screen 1500 in a similar manner as illustrated in FIG. 17. In this illustrated configuration, the total field-of-view for the toroidal constant vertical resolution rear projection display screen 1500 may be greater than or equal to 220-degrees, each of the three motion platform mounted horizontal image projectors 1800 would cover approximately one-third of the total field-of-view, that is, approximately 73-degrees with no image overlap, or approximately 78-degrees with a 10-degree overlap between vertical edges of each projected image.

Figure 19:
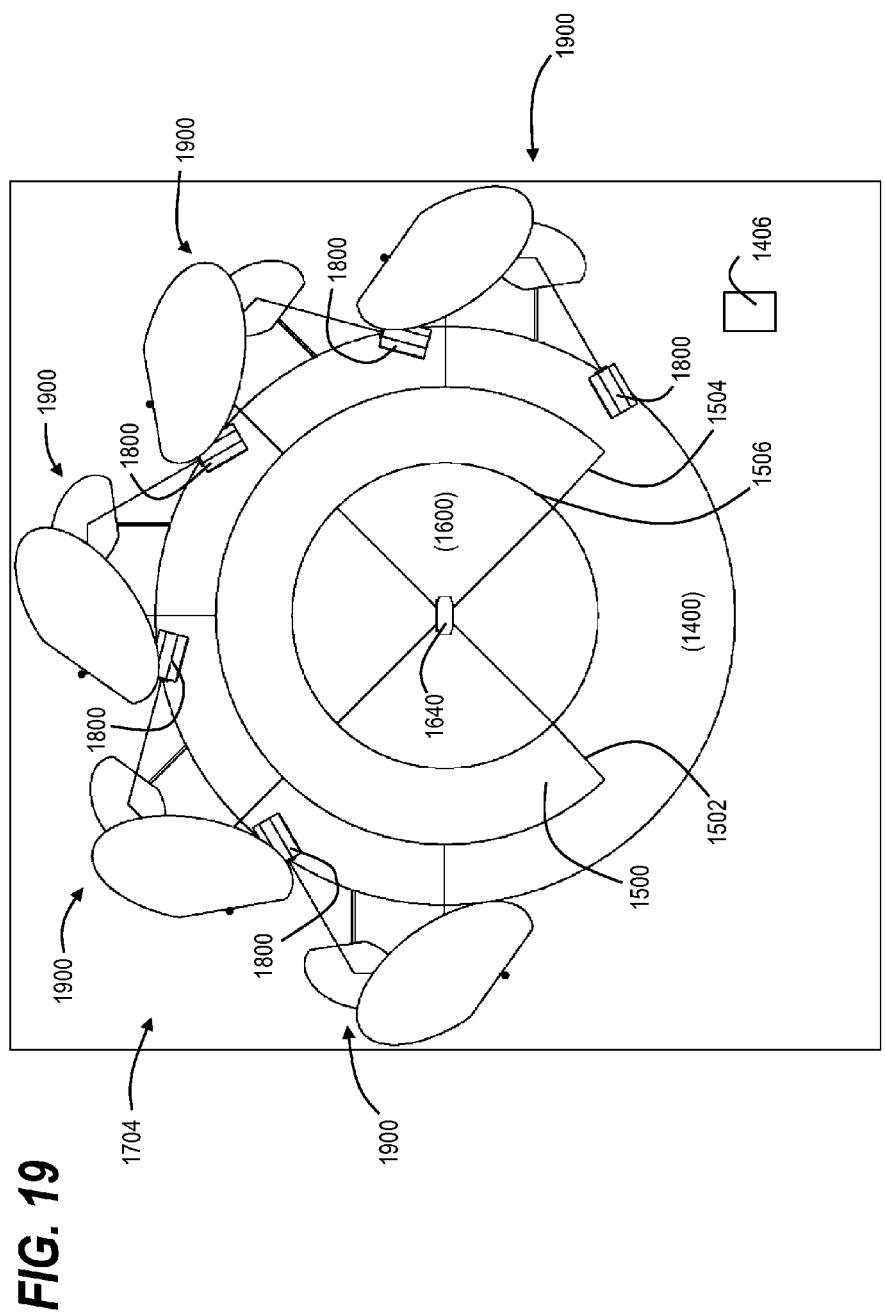
FIG. 19 illustrates a top view of a schematic representation of five motion platform mounted horizontal image projection assemblies having five projector and mirror assemblies for projecting five images onto the toroidal constant vertical resolution rear projection display screen in accordance with the embodiments presented.

FIG. 19, in a similar manner to FIG. 18, illustrates a top view of a schematic representation of a motion platform mounted horizontal image projection assembly 1704 including five motion image projectors 1800 mounted in a radial array around a center point of the motion platform 1400, and five corresponding motion platform mounted horizontal mirror assemblies 1900 for projecting multiple images onto portions of the toroidal constant vertical resolution rear projection display screen 1500 in a similar manner as illustrated in FIGS. 17 and 18. In this illustrated configuration, the total field-of-view for the toroidal constant vertical resolution rear projection display screen 1500 may be greater than or equal to 220-degrees, where each of the five motion platform mounted horizontal image projectors 1800 would cover approximately one-fifth of the total field-of-view, that is, approximately 44-degrees with no image overlap, or approximately 49-degrees with a 10-degree overlap between vertical edges of each projected image.

Figure 20:
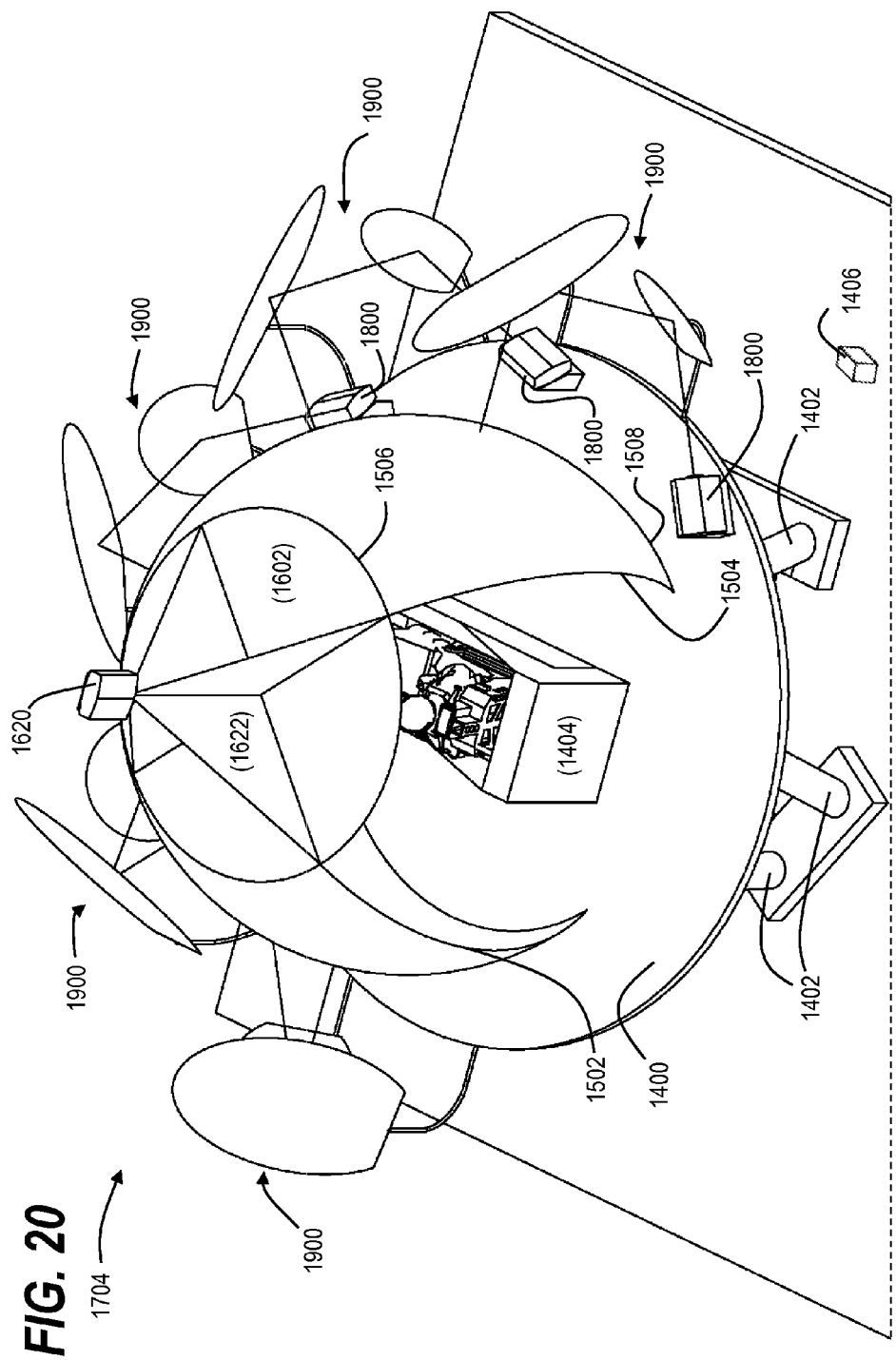
FIG. 20 illustrates a schematic representation of the motion platform mounted horizontal image projection assemblies of FIG. 19 in accordance with the embodiments presented.

FIG. 20 illustrates a schematic representation of a schematic representation of a motion platform mounted horizontal image projection assembly 1704 including five motion image projectors 1800 mounted in a radial array around a center point of the motion platform 1400, and five corresponding motion platform mounted horizontal mirror assemblies 1900 for projecting multiple images onto portions of the toroidal constant vertical resolution rear projection display screen 1500 in a similar manner as illustrated in FIG. 19. FIG. 20 also illustrates the top screen surface 1602 having the vertical image projector 1620 and the simulated vehicle cockpit 1404 positioned within a partially enclosed area defined by the toroidal constant vertical resolution rear projection display screen 1500 and the top screen surface 1602.

Figure 21:
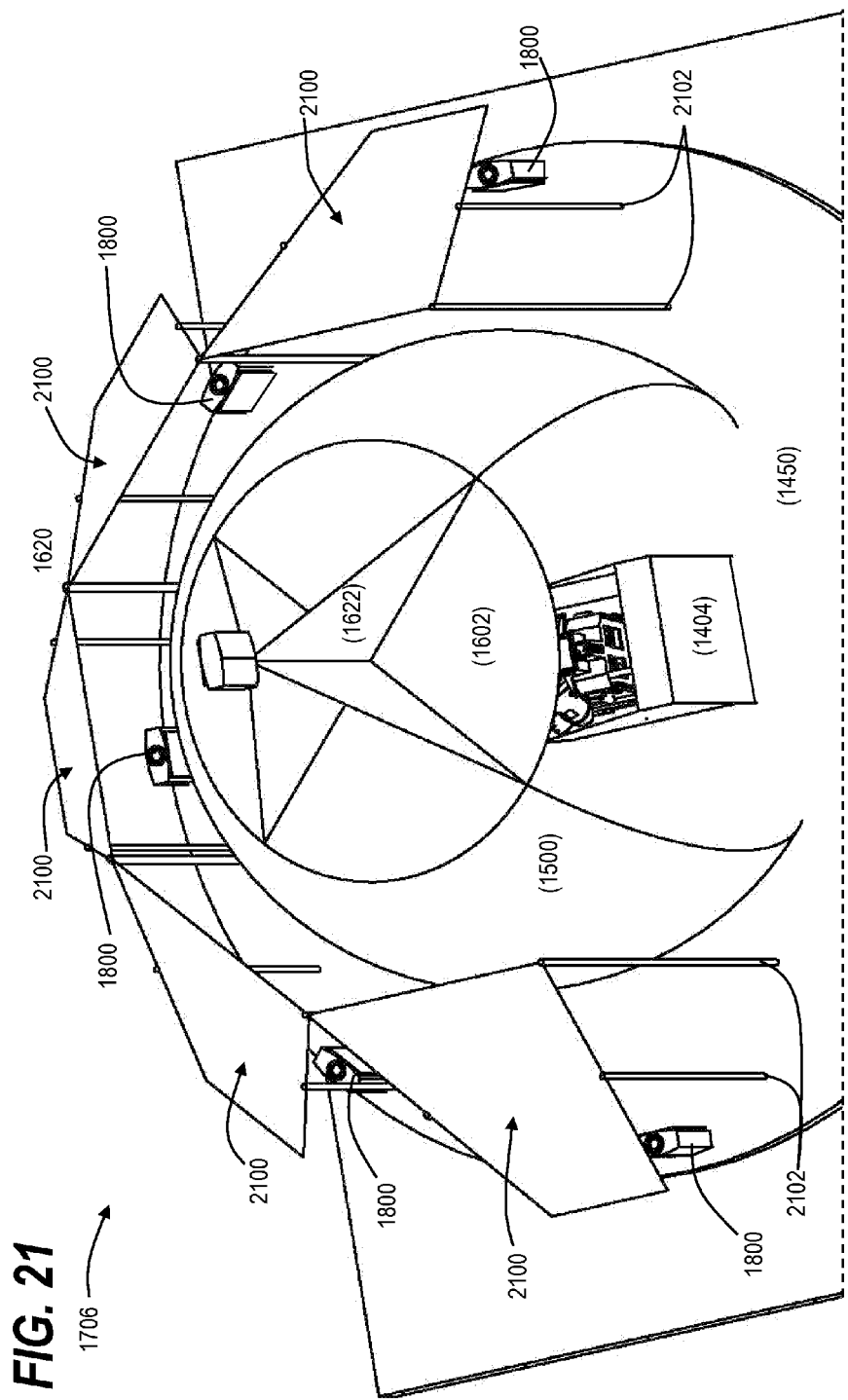
FIG. 21 illustrates an alternative embodiment of a schematic representation of the motion platform mounted horizontal image projection assemblies of FIGS. 19-20 in accordance with the embodiments presented.

FIG. 21 illustrates an alternative embodiment a schematic representation of a schematic representation of a platform 1450 mounted horizontal image projection assembly 1706 including five motion image projectors 1800 mounted in a radial array around a center point of the platform 1450, and five corresponding motion platform mounted horizontal mirrors 2100 for projecting multiple images onto portions of the toroidal constant vertical resolution rear projection display screen 1500 in a similar manner as illustrated in FIGS. 19-20. This single mirror 2100 and projector 1800 configuration may allow for applications for image projection where a platform for example, 1450, similar to motion platform 1400 of FIGS. 14-20, may be fixed and immobile. For example, a more cost-effective non-motion base application may use a floor mounted projector 1800 and a single reflection mirror 2100 mounted to the platform via mirror supports 2102 for image reflection when it may not be necessary for the mirrors to be located proximate the upper surface platform 1450. FIG. 21 also illustrates, similarly to FIGS. 19-20, the top screen surface 1602 having the vertical image projector 1620 and the simulated vehicle cockpit 1404 positioned within a partially enclosed area defined by the toroidal constant vertical resolution rear projection display screen 1500 and the top screen surface 1602.

Figure 22:
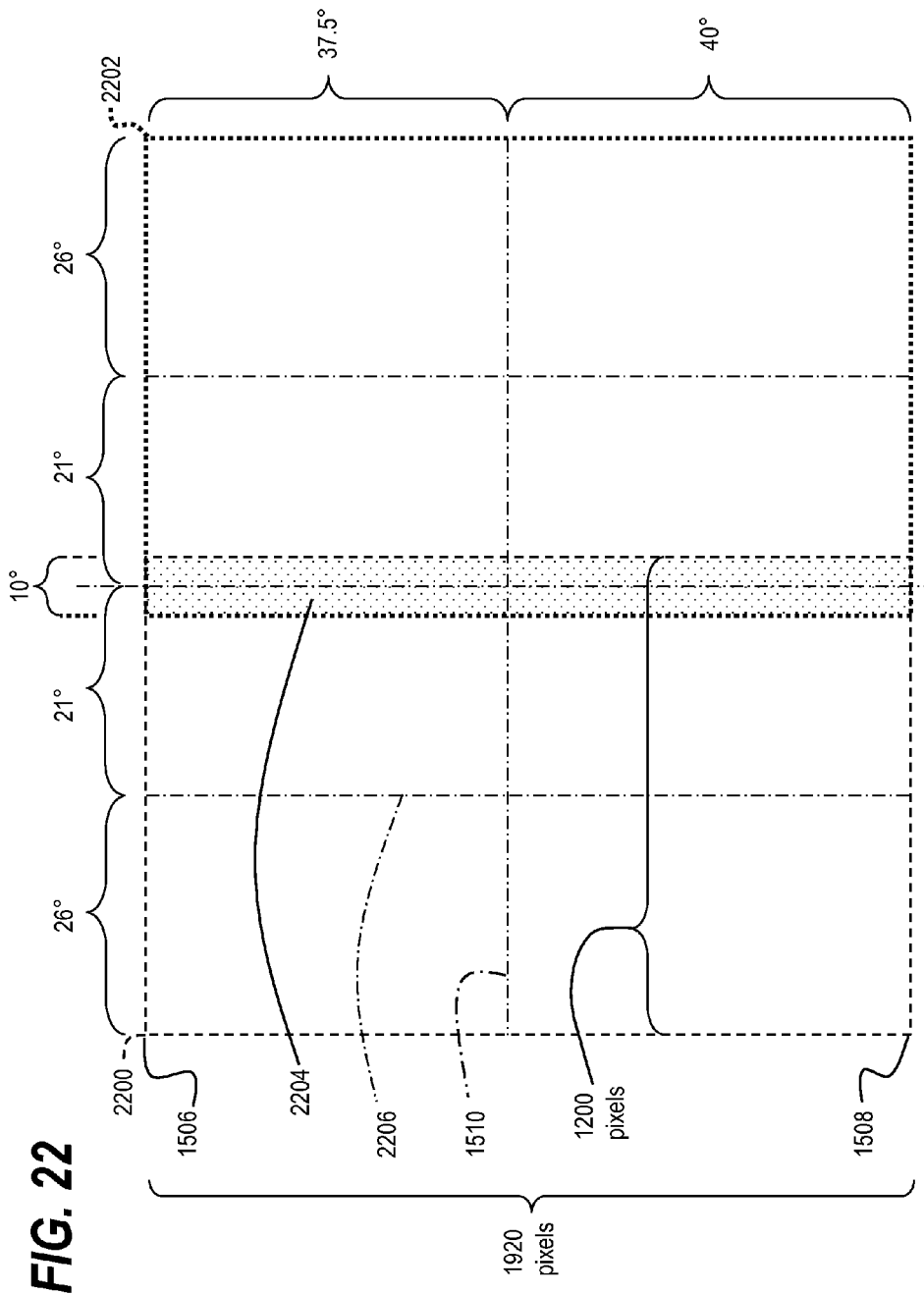
FIG. 22 illustrates a schematic representation of two adjacent projected images from adjacent image projectors illustrating a vertical image overlap between the adjacent projected images in accordance with the embodiments presented.

FIG. 22 illustrates a schematic representation of two adjacent projected images from adjacent image projectors 1800, (for example, as shown in FIGS. 17-20), illustrating a vertical image overlap 2204 between the adjacent projected images. A first 1920×1200 pixel image 2200, (illustrated by dashed lines), configured to be projected by any of the above-disclosed horizontal image projectors 1800, overlaps a second 1920×1200 pixel image 2202, (illustrated by dotted lines), configured to be projected by an adjacent image projector 1800, at an overlapping image portion 2204. The overlap of the first pixel image 2200 and the second adjacent pixel image 2202 is defined by a 10-degree overlapping portion 2204 along adjacent vertical edges of each projected image. This overlapping portion 2204 allows the images of adjacent image projectors to be seamlessly joined together without any visible irregularity or discontinuity between each adjacent projected image.

As illustrated, the first pixel image 2200 is defined by the top edge of toroidal constant vertical resolution rear projection display screen 1506 and the bottom edge of toroidal constant vertical resolution rear projection display screen 1508. The horizontal eye-point line 1510 divides the image into an upper 37.5-degree portion and a lower 40-degree portion. A representative vertical center line 2206 is illustrated on the first pixel image 2200 that divides the image in half at 26-degrees. The vertical image overlap 2204 between the adjacent projected images has a width of 10-degrees defined by a separate 5-degree overlap of the vertical edge of each adjacent projected image.

The configuration as illustrated in FIGS. 19-20 may use five projectors and have a field of view of equal to or greater than 220 degrees in a horizontal viewing direction, by 37.5-degrees in an upward vertical viewing direction and 40-degrees in a downward vertical viewing direction. In this example, the projectors may have a resolution of 1920×1200 pixels. Projectors with other resolutions may be used, producing corresponding changes in image resolution on a projection screen. These results can be achieved with a toroidal shaped screen having a major radius of 100 inches and a minor radius of 50 inches.

In summary, a vehicle simulation system includes a motion platform 1400 capable of being articulated in a variety of directions, a simulated vehicle cockpit or control center 1404 mounted to the motion platform 1400, image projectors 1620 and 1800 capable of projecting a simulated visual display around the simulated vehicle cockpit or control center 1404, and an image projection screen 1500 capable of receiving the simulated visual display from the image projectors 1620 and 1800 on a convex portion 1512 of the image projection screen 1500. The image projection screen 1500 is a toroidal constant vertical resolution surface generated by identifying: 1) a design eye-point 1530 of a viewer relative to the simulated vehicle cockpit or control center 1404 to be positioned on a concave portion 1514 of the toroidal constant vertical resolution surface; 2) a viewing distance 920 (as shown in FIG. 9) from the design eye-point 1530 of the viewer to the concave portion 1514 of the toroidal constant vertical resolution surface in a direction of a projected image from one of the image projectors 1620 and 1800; and 3) a projection distance 918 (as shown in FIG. 9) from one of the plurality image projectors to a convex portion 1512 of the toroidal constant vertical resolution surface in a direction toward the design eye-point 1530 of the viewer. A constant vertical resolution elevation curve 1516 is created based on a locus of points defined by an intersection of a set of equal angular increment lines 916 (as shown in FIG. 9) of the viewing distance 920 (as shown in FIG. 9) from the design eye-point 1530 of the viewer with a set of equal pixel size increment lines of the projected image 904 (as shown in FIG. 9) from one of the image projectors 1620 and 1800 based on the projection distance 918 (as shown in FIG. 9) from one of the image projectors 1620 and 1800. The toroidal constant vertical resolution surface is created being defined by a constant vertical resolution elevation curve 1516 being at least partially rotated about at least a portion of a central vertical axis 1520 intersecting with the design eye-point 1530 of the viewer relative to the simulated vehicle cockpit or control center 1404 to produce the toroidal constant vertical resolution surface in a vertical direction as a function of elevation.

The image projection screen 1500 may be truncated in the vertical direction at a top portion 1506 to provide a vertical field-of-view from the design eye-point 1530 of the viewer greater than or equal to 35-degrees. A top surface screen 1602 intersects the top portion 1506 of the image projection screen 1500 defined by a circular azimuth curve 1154 (as shown in FIG. 11). The image projection screen 1500 may be truncated in a horizontal radial direction about the central vertical axis 1520 intersecting with the design eye-point 1530 of the viewer to provide a radial horizontal field-of-view greater than or equal to 220-degrees, and sufficient to provide the simulated vehicle cockpit or control center 1404 to be inserted within and removed from an area enclosed by the image projection screen 1500.

The image projectors 1620 and 1800 may be arranged in a radial array around the central vertical axis 1520 intersecting with the design eye-point 1530 of the viewer, and being mounted proximate a plane defined by an upper surface 1401 of the motion platform 1400. Opposing vertical edge portions of images from at least two of the image projectors 1620 and 1800 may be overlapped with adjacent opposing vertical edge portions of images of adjacent image projectors of the image projectors 1620 and 1800 to provide a single continuous image across the image projection screen 1500.

At least one mirror for each of the image projectors 1620 and 1800 may reflect the projected image onto the image projection screen 1500, at least one mirror for each of the image projectors 1620 and 1800 may be attached to the motion platform 1400 and proximate a respective image projector. The image projectors 1620 and 1800 illuminate the convex portion 1512 of the image projection screen 1500 and the design eye-point 1530 of the viewer relative to the simulated vehicle cockpit or control center 1404 being located within an area partially enclosed by the image projection screen 1500 being capable of viewing the simulated visual display on a concave portion 1514 of the image projection screen 1500.

The image projectors 1620 and 1800 may be attached to the motion platform 1400 proximate a bottom portion 1508 of the image projection screen 1500, and wherein a corresponding plurality of mirrors 1902 and 1906 capable of reflecting corresponding projected images from the image projectors 1620 and 1800 may be attached to the motion platform 1400 proximate the bottom portion 1508 of the image projection screen 1500.

A visual image projection and display system may include a motion platform 1400, a toroidal constant vertical resolution surface having a bottom portion 1508 mounted to the motion platform 1400 and capable of displaying a single substantially constant vertical resolution image by blending portions of adjacent projected images on the toroidal constant vertical resolution surface, a top surface screen 1602 intersecting the a top portion 1506 of the constant vertical resolution surface defined by a circular azimuth curve 1154 (as shown in FIG. 11), and a set of image projectors 1800. The set of image projectors 1800 may include a radial array of image projectors 1800 mounted on the motion platform 1400 that project a corresponding series of images via at least one mirror 1902/1906 attached to the motion platform 1400 onto a convex portion 1512 of the toroidal constant vertical resolution surface, and at least one image projector 1620 that projects an image on the top surface screen 1602.

Figure 23:
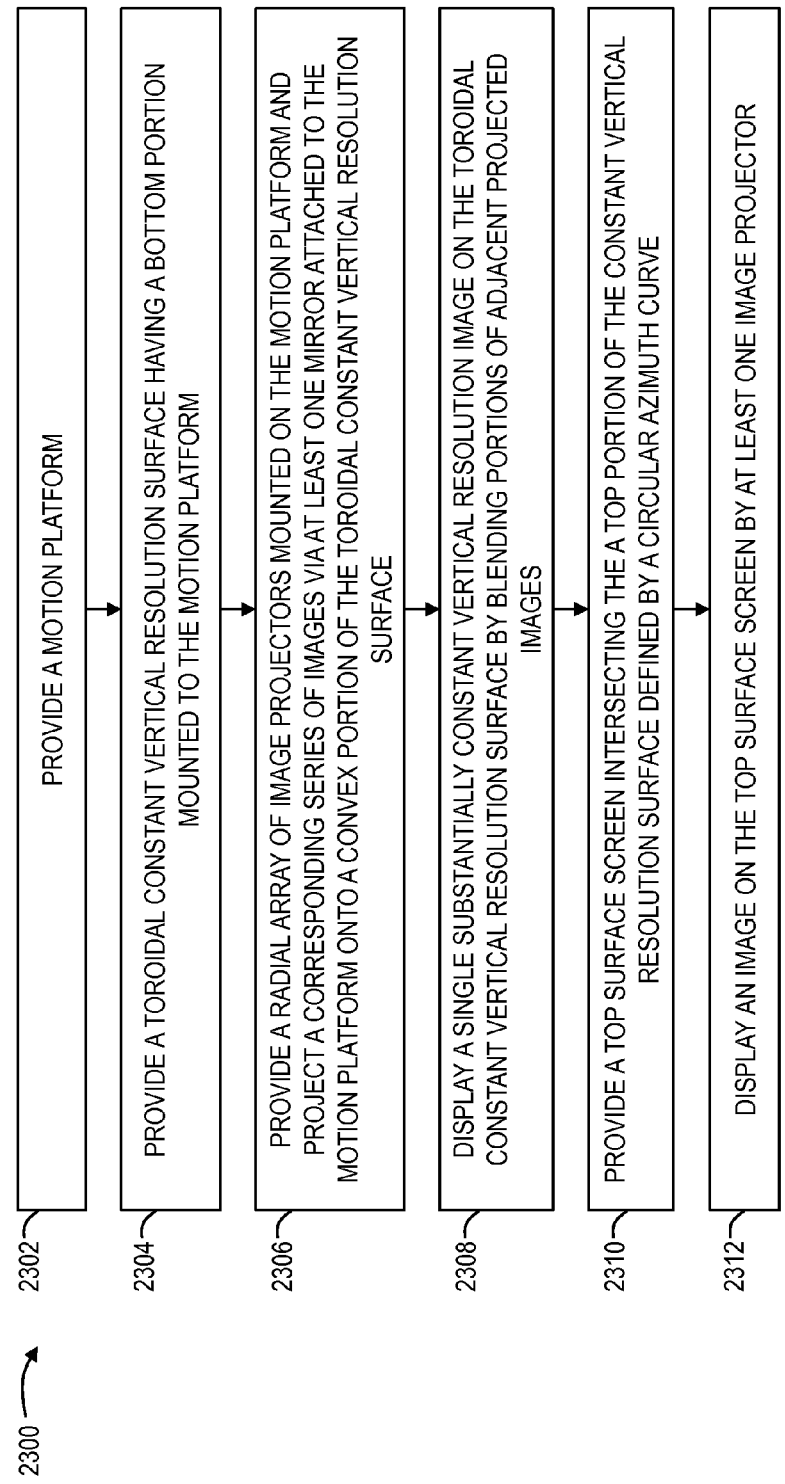
FIG. 23 illustrates a logic flowchart of a method of using a visual image projection and display system in accordance with the embodiments presented.

FIG. 23 illustrates a method 2300 of using a visual image projection and display system includes providing 2302 a motion platform 1400, providing 2304 a toroidal constant vertical resolution surface 1500 having a bottom portion 1508 mounted to the motion platform 1400, and providing 2306 a radial array of image projectors 1800 mounted on the motion platform 1400 and project a corresponding series of images via at least one mirror 1902/1906 attached to the motion platform 1400 onto a convex portion 1514 of the toroidal constant vertical resolution surface 1500. The method further displays 2308 a single substantially constant vertical resolution image on the toroidal constant vertical resolution surface 1500 by blending portions of adjacent projected images. The method further provides 2310 a top surface screen 1602 intersecting the a top portion 1506 of the constant vertical resolution surface 1500 defined by a circular azimuth curve and displays 2312 an image on the top surface screen by at least one image projector 1620.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A vehicle simulation system, comprising:
a vehicle simulator control system;
a motion platform capable of responding to motion signals from the vehicle simulator control system;
a simulated vehicle control center mounted to the motion platform; and
a visual display system mounted to the motion platform and substantially surrounding the simulated vehicle control center, the visual display system including
a plurality of image projectors capable of projecting a simulated visual display around the simulated vehicle control center, and
an image projection screen capable of receiving the simulated visual display from the plurality of image projectors on a convex portion of the image projection screen, the image projection screen being a toroidal constant vertical resolution surface defined by a constant vertical resolution elevation curve being at least partially rotated about at least a portion of a central vertical axis intersecting with a design eye-point of a viewer relative to the simulated vehicle control center to produce the toroidal constant vertical resolution surface in a vertical direction as a function of elevation.

2. The vehicle simulation system according to claim 1, wherein the toroidal constant vertical resolution surface is generated by identifying the design eye-point of the viewer being positioned on a concave portion of the toroidal constant vertical resolution surface of the image projection screen.

3. The vehicle simulation system according to claim 2, wherein the toroidal constant vertical resolution surface is further generated by identifying a viewing distance from the design eye-point of the viewer to the concave portion of the toroidal constant vertical resolution surface of the image projection screen in a direction of a projected image from one of the plurality of image projectors.

4. The vehicle simulation system according to claim 3, wherein the toroidal constant vertical resolution surface is further generated by identifying a projection distance from one of the plurality image projectors to the convex portion of the toroidal constant vertical resolution surface of the image projection screen in a direction toward the design eye-point of the viewer.

5. The vehicle simulation system according to claim 4, wherein the toroidal constant vertical resolution surface is further generated by creating the constant vertical resolution elevation curve based on a locus of points defined by an intersection of a set of equal angular increment lines of the viewing distance from the design eye-point of the viewer with a set of equal pixel size increment lines of the projected image from one of the plurality of image projectors based on the projection distance from one of the plurality of image projectors.

6. The vehicle simulation system according to claim 5, wherein the set of equal angular increment lines are further defined by the viewing distance from the design eye-point of the viewer being rotated in a vertical direction.

7. The vehicle simulation system according to claim 5, wherein the set of equal pixel size increment lines are further defined by being constrained to a vertical plane both at and normal to the projection distance from one of the plurality of image projectors.

8. The vehicle simulation system according to claim 1, wherein the toroidal constant vertical resolution surface further being defined by any horizontal section of the toroidal constant vertical resolution surface normal to the central vertical axis being a constant distance from the central vertical axis.

9. The vehicle simulation system according to claim 1, further comprising joining a plurality of the toroidal constant vertical resolution surfaces at their vertical edges to create the image projection screen,
wherein each of the plurality of toroidal constant vertical resolution surfaces of the image projection screen being capable of receiving and displaying a substantially constant vertical resolution projected image from one of the plurality of image projectors.

10. The vehicle simulation system according to claim 9, wherein the image projection screen further being defined by any horizontal section of the image projection screen normal to the central vertical axis being a constant distance from the central vertical axis.

11. A vehicle simulation system, comprising:
a motion platform capable of being articulated in a plurality of directions;
a simulated vehicle control center mounted to the motion platform;
a plurality of image projectors capable of projecting a simulated visual display around the simulated vehicle control center; and
an image projection screen capable of receiving the simulated visual display from the plurality of image projectors on a convex portion of the image projection screen, the image projection screen being a toroidal constant vertical resolution surface generated by
identifying a design eye-point of a viewer relative to the simulated vehicle control center to be positioned on a concave portion of the toroidal constant vertical resolution surface,
identifying a viewing distance from the design eye-point of the viewer to the concave portion of the toroidal constant vertical resolution surface in a direction of a projected image from one of the plurality of image projectors, identifying a projection distance from one of the plurality image projectors to a convex portion of the toroidal constant vertical resolution surface in a direction toward the design eye-point of the viewer, creating a constant vertical resolution elevation curve based on a locus of points defined by an intersection of a set of equal angular increment lines of the viewing distance from the design eye-point of the viewer with a set of equal pixel size increment lines of the projected image from one of the plurality of image projectors based on the projection distance from one of the plurality of image projectors, and creating the toroidal constant vertical resolution surface defined by a constant vertical resolution elevation curve being at least partially rotated about at least a portion of a central vertical axis intersecting with the design eye-point of the viewer relative to the simulated vehicle control center to produce the toroidal constant vertical resolution surface in a vertical direction as a function of elevation.

12. The vehicle simulation system according to claim 11, where the image projection screen being truncated in the vertical direction at a top portion to provide a vertical field-of-view from the design eye-point of the viewer greater than or equal to 35-degrees.

13. The vehicle simulation system according to claim 12, further comprising a top surface screen intersecting the top portion of the image projection screen defined by a circular azimuth curve.

14. The vehicle simulation system according to claim 11, where the image projection screen being truncated in a horizontal radial direction about the central vertical axis intersecting with the design eye-point of the viewer to provide a radial horizontal field-of-view greater than or equal to 220-degrees, and sufficient to provide the simulated vehicle control center to be inserted within and removed from an area enclosed by the image projection screen.

15. The vehicle simulation system according to claim 11, where the plurality of image projectors being arranged in a radial array around the central vertical axis intersecting with the design eye-point of the viewer, and being mounted proximate a plane defined by an upper surface of the motion platform.

16. The vehicle simulation system according to claim 15, wherein opposing vertical edge portions of images from at least two of the plurality of image projectors being overlapped with adjacent opposing vertical edge portions of images of adjacent image projectors of the plurality of image projectors to provide a single continuous image across the image projection screen.

17. The vehicle simulation system according to claim 15, further comprising at least one mirror for each of the plurality of image projectors that reflects the projected image onto the image projection screen, the at least one mirror for each of the plurality of image projectors being attached to the motion platform and proximate a respective image projector.

18. The vehicle simulation system according to claim 15, where the plurality of image projectors illuminate the convex portion of the image projection screen and the design eye-point of the viewer relative to the simulated vehicle control center being located within an area partially enclosed by the image projection screen being capable of viewing the simulated visual display on a concave portion of the image projection screen.

19. The vehicle simulation system according to claim 11, wherein the plurality of image projectors are attached to the motion platform proximate a bottom portion of the image projection screen, and wherein a corresponding plurality of mirrors capable of reflecting corresponding projected images from the plurality of image projectors being attached to the motion platform proximate the bottom portion of the image projection screen.

20. A method of using a visual image projection and display system comprises:

providing a motion platform;

providing a toroidal constant vertical resolution surface having a bottom portion mounted to the motion platform;

providing a radial array of image projectors mounted on the motion platform and project a corresponding series of images via at least one mirror attached to the motion platform onto a convex portion of the toroidal constant vertical resolution surface;

displaying a single substantially constant vertical resolution image on the toroidal constant vertical resolution surface by blending portions of adjacent projected images;

providing a top surface screen intersecting the a top portion of the constant vertical resolution surface defined by a circular azimuth curve; and displaying an image on the top surface screen by at least one image projector.

* * * * *